(12) United States Patent
Liu et al.

(10) Patent No.: US 11,710,604 B2
(45) Date of Patent: Jul. 25, 2023

(54) SUPERCAPACITOR CONTAINING ANTIFREEZING ZWITTERION HYDROGEL ELECTROLYTE AND PREPARATION METHOD THEREOF

(71) Applicant: QILU UNIVERSITY OF TECHNOLOGY, Jinan (CN)

(72) Inventors: Libin Liu, Jinan (CN); Jianbo Yang, Jinan (CN); Qing Ban, Jinan (CN); Ligang Gai, Jinan (CN); Xuelin Li, Jinan (CN); Mei Li, Jinan (CN)

(73) Assignee: QILU UNIVERSITY OF TECHNOLOGY, Jinan (CN)

( * ) Notice: Subject to any disclaimer, the term of this patent is extended or adjusted under 35 U.S.C. 154(b) by 0 days.

(21) Appl. No.: 17/453,471

(22) Filed: Nov. 3, 2021

(65) Prior Publication Data

US 2022/0181093 A1   Jun. 9, 2022

Related U.S. Application Data

(63) Continuation of application No. PCT/CN2021/097104, filed on May 31, 2021.

(51) Int. Cl.
*H01G 11/56* (2013.01)
*H01G 11/84* (2013.01)

(52) U.S. Cl.
CPC ............. *H01G 11/56* (2013.01); *H01G 11/84* (2013.01)

(58) Field of Classification Search
None
See application file for complete search history.

(56) References Cited

U.S. PATENT DOCUMENTS

| | | | | |
|---|---|---|---|---|
| 2021/0202989 A1* | 7/2021 | Lee | ..................... | H01G 11/84 |
| 2022/0181093 A1* | 6/2022 | Liu | ..................... | H01G 11/84 |

FOREIGN PATENT DOCUMENTS

| | | | | | |
|---|---|---|---|---|---|
| CN | 111019041 A | * | 4/2020 | ............ | C08F 220/20 |
| CN | 111261425 A | * | 6/2020 | ............ | H01G 11/56 |
| CN | 109935476 B | * | 3/2021 | | |
| CN | 112735849 A | * | 4/2021 | ............... | C08F 2/44 |
| CN | 112768255 A | * | 5/2021 | | |
| WO | WO-2021129607 A1 | * | 7/2021 | ............ | C08F 220/20 |

* cited by examiner

*Primary Examiner* — Dion R. Ferguson
(74) *Attorney, Agent, or Firm* — CBM Patent Consulting, LLC

(57) ABSTRACT

A supercapacitor contains the zwitterionic polymer hydrogel electrolyte. A change rate of a capacitance retention of the supercapacitor, relative to a specific area capacity at 25° C. is less than 25% at extreme temperature. When temperature is increased to 60° C. or reduced to −30° C. the specific area capacity is changed to 178 mF $cm^{-2}$ and 134 mF $cm^{-2}$, which are 104% and 78% of that at 25° C. indicating an excellent electrochemical property at the extreme temperature.

10 Claims, 23 Drawing Sheets

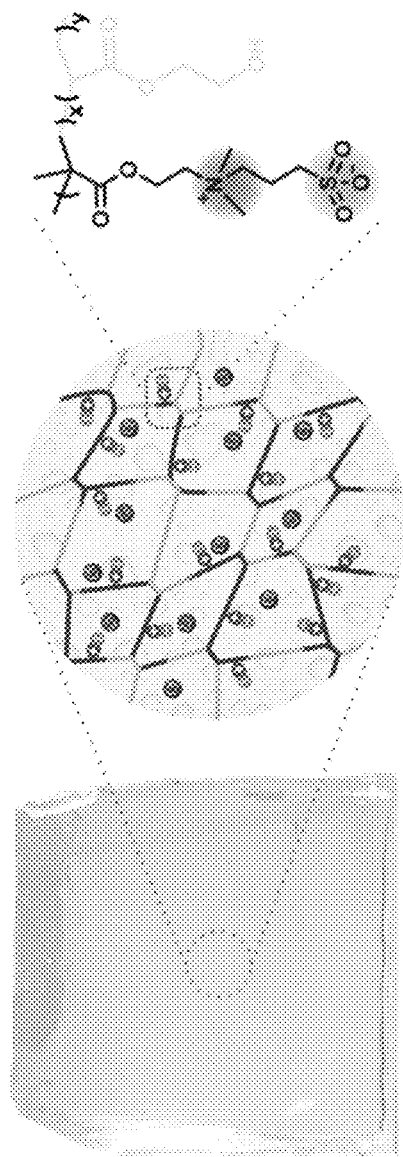
Fig. 1
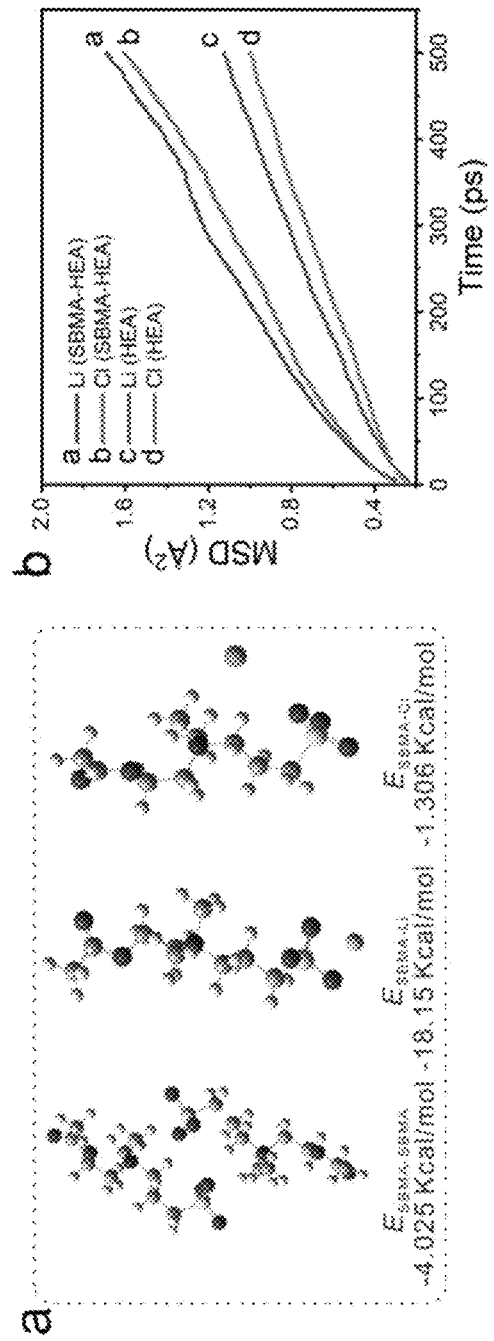
Fig. 2A
Fig. 2B

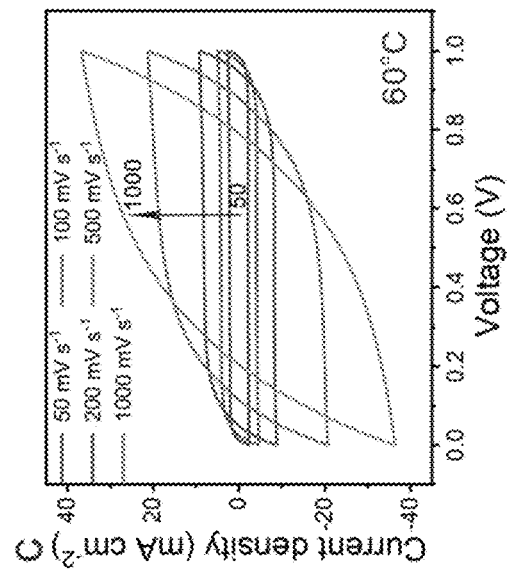
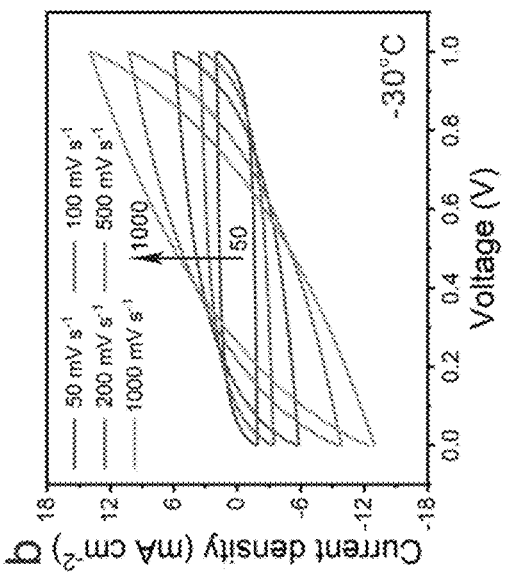
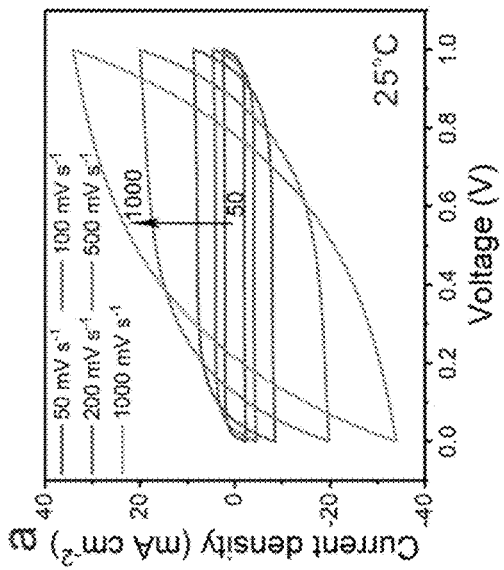
Fig. 10C
Fig. 10B
Fig. 10A

US 11,710,604 B2

SUPERCAPACITOR CONTAINING ANTIFREEZING ZWITTERION HYDROGEL ELECTROLYTE AND PREPARATION METHOD THEREOF

FIELD OF THE INVENTION

This application is the continuation application of International Application No. PCT/CN2021/097104 filed on 31 May 2021 which designated the U.S. and claims priority to Chinese Application No. 202011419379.1 filed on 6 Dec. 2020, the entire contents of each of which are hereby incorporated by reference.

FIELD OF THE INVENTION

The present disclosure belongs to the field of supercapacitors, and relates to a supercapacitor containing a zwitterionic polymer hydrogel electrolyte and a preparation method thereof.

BACKGROUND OF THE INVENTION

With continuous growing in demands on global energy, the higher requirement is presented on the development of high-efficiency energy storage apparatus. The supercapacitor, as a new energy storage device, arouses wide concerns due to high charge-discharge speed and long operating life. During 2012 to 2019, the annual average compound growth rate of the supercapacitor market size in China was about 35%, and the supercapacitor market size was even up to about RMB 12 billion last year, in which supercapacitors for transportation were the most primary drive to support the development of the whole industry.

A supercapacitor, also called electrochemical capacitor, is an electrochemical energy storage device between a battery (high energy density, but low power density) and a traditional dielectric capacitor (high power density, but low energy density) in an energy density-power density relationship diagram. The operating principle of the supercapacitor is such that an electrolyte ion undergoes electrostatic separation at an electrode/electrolyte interface, and stores electric energy in the form of an electrochemical double-layer capacitor under the action of an external electric field. Although the supercapacitor has high power density and long cycle life, compared with the battery, it has low energy density, which limits its scope of application. Therefore, improving its energy density on the premise of no damage to the power density and cycle life of the supercapacitor is a key problem of the electrochemical energy storage field.

An electrolyte includes a liquid electrolyte and a solid electrolyte, which is an indispensable constituent part of the supercapacitor. Compared with the liquid electrolyte, the low electrical conductivity of the solid electrolyte is a primary defect that affects the high performance of the energy storage device. Due to high electrical conductivity at room temperature, a polymer hydrogel electrolyte has become the hot spot of a study on a high-performance solid supercapacitor. However, a large amount of water in a hydrogel network is frozen inevitably below zero, and therefore, the electrical conductivity of the polymer hydrogel electrolyte will be reduced sharply below 0° C.

Adding organic liquid in hydrogel is a method for obtaining antifreezing hydrogel. The common organic liquid includes glycol, glycerol, dimethyl sulfoxide, and the like. In these binary/ternary systems, it is believed that the interaction of organic liquid with water molecules is the primary reason of inhibiting the formation of an ice crystal lattice. However, due to the existence of the organic liquid, the hydrogel is either non-conducting or low in electrical conductivity. In addition, the volatility and high pyrophorisity of the organic liquid cause severe safety hazards to the organic hydrogel electrolyte. It is a major problem of how to realize the freezing prevention of the supercapacitor containing the hydrogel electrolyte at low temperature.

SUMMARY OF THE INVENTION

The present disclosure aims to provide a supercapacitor containing an antifreezing zwitterionic polymer hydrogel electrolyte and a preparation method thereof in terms of the deficiency of the prior art. The supercapacitor which is assembled by using activated carbon as an electrode and contains a zwitterionic polymer hydrogel electrolyte not only has an excellent freezing resistance, but has also a wider operating temperature range and an ability to operate at low temperature for a long time.

A supercapacitor, characterized by containing a zwitterionic polymer hydrogel electrolyte.

A change rate of a capacitance retention of the supercapacitor, relative to a specific area capacity at 25° C., is less than 25% at extreme temperature. For example, when temperature is increased to 60° C. or reduced to −30° C., the specific area capacity is changed to 178 mF cm$^{-2}$ and 134 mF cm$^{-2}$, which are 104% and 78% of that at 25° C., indicating an excellent electrochemical property at an extreme temperature.

The extreme temperature refers to high temperature (above 50° C.) or low temperature (below 0° C.). Generally, hydrogel will be frozen due to water freezing at low temperature, and will be dehydrated at high temperature, resulting in failure in the operation of the supercapacitor. The extreme temperature is defined broadly, that is, low temperature is below 0° C., and high temperature is not specified, but generally, the electrochemical property will be affected largely at 50° C. In the present application, in case of no special instructions, the extreme temperature refers to temperature above 50° C. or below 0° C.

When the supercapacitor is placed at low temperature of −30° C. for more than 30 days, its capacitance is still reserved by more than 95% of the original capacitance (see FIG. 15 b). Cycling stability is tested at different temperatures. As shown in the FIG. 15c, upon 10,000 cycles, the supercapacitor has capacitance retention of 71%, 81%, and 76.4% respectively at −30° C., 25° C., and 60° C. Such excellent cycle performance indicates a polySH-based supercapacitor can operate at low temperature and high temperature for a long time.

The antifreezing zwitterion hydrogel electrolyte (polySH) is a poly(SBMA-HEA) electrolyte in the presence of LiCl, and Li$^+$ undergoes hopping migration through a zwitterionic group on a polymer chain, thereby improving ionic conductivity; in a Raman spectrum, S=O stretching vibration in —SO$_3^-$ is 1044 cm$^{-1}$ to 1054 cm$^{-1}$, and CH3 stretching vibration in —N$^+$(CH$_3$)$_2$ is 2953 cm$^{-1}$ to 2957 cm$^{-1}$, indicating that the zwitterionic group exists and provides a site for Li+ migration; DSC proves that LiCl forms a Li+(H2O)n solvation structure with H$_2$O to improve the freezing resistance of the hydrogel electrolyte, so that it still has an elongation of 325% at −40° C.; and the hydrogel electrolyte has the excellent ionic conductivity, which can be applied in an ionic conductor and energy storage equipment.

Preferably, at a room temperature, the electrical conductivity of the polySH electrolyte ranges from 114 to 147 mS cm$^{-1}$. The energy storage modulus G' of the polySH electrolyte is larger than loss modulus G". At −40° C., the electrical conductivity of the polySH electrolyte at low temperature ranges from 11 to 13 mS cm$^{-1}$. The electrolyte can be stretched to 300 to 350% of strain at −40° C. When the electrolyte is compressed to 75% of strain, a compressible curve of the electrolyte is similar to that at a room temperature.

Preferably, the content of freezable water in the electrolytes is lower than 10% (polySH-5, and polySH-7); and preferably, the content of the freezable water in the electrolyte is zero. (polySH-7).

Preferably, a diffusion coefficient of a water molecule of the electrolyte is smaller than or equal to $11.21*10^{-6}$ cm$^2$ s$^{-1}$. Preferably, the electrolyte has a water molecule diffusion coefficient of less than or equal to $1.02*10^{-6}$ cm$^2$ s$^{-1}$.

According to a preparation method for the hydrogel electrolyte, in the presence of LiCl, the zwitterionic type polySH electrolyte is prepared from SBMA and HEA by a one-pot random polymerization method. The preparation method includes the following steps of:

1) Dissolving LiCl in a first solvent to prepare 1-7 mol L$^{-1}$ of LiCl deionized aqueous solution.
2) Dissolving SBMA and HEA in the LiCl solution in a molar ratio of SBMA to HEA of 1:(3-5). Placing the solution in an ice bath, stirring for 1 h, and then, adding an initiator AIBA in an adding amount equivalent to 0.5 to 2 wt % of total mass of a monomer. Then, placing in the ice bath, and stirring for 1.5 h.
3) After dissolving the solution completely, performing ultrasonic treatment for 8 to 15 min to remove bubbles; and then, injecting the solution into a mold, and polymerizing in a sealed environment of 30 to 50° C. for 8 to 16 h.

Preferably, in step 1), the concentration of the LiCl deionized aqueous solution ranges from 3 to 7 mol L$^{-1}$; and more preferably, in step 1), the concentration of the LiCl deionized aqueous solution ranges from 5 to 7 mol L$^{-1}$.

Preferably, in step 2), the adding amount of the initiator is equivalent to 1 wt % of the total mass of the monomer.

Preferably, in step 3), ultrasonic treatment is performed for 10 min to remove the bubbles.

Preferably, in step 3), polymerization in the sealing environment means polymerizing in the sealed environment of 38° C. for 12 h.

Hydrogel obtained through polymerization is polySH-x for short, where x is the molar concentration of LiCl.

A preparation method for the supercapacitor includes the following steps of:

1) Preparing activated carbon electrodes:dispersing activated carbon AC, conductive carbon black, and PVDF (mass ratio of 8:1:1) in NMP to prepare uniformly dispersed material slurry. Coating the slurry onto carbon cloth and drying in a vacuum oven at 80° C. for 24 h, and after drying, obtaining the AC electrodes, a loading capacity of an active material on each electrode is about 2.5 mg cm$^{-2}$; and
2) assembling the supercapacitor:covering two sides of the electrolyte with two AC electrodes with the same loading areas (0.5 cm×1.2 cm) to form a sandwich structure for preparation of the supercapacitor. Then, dripping a drop of polySH electrolyte precursor solution on the electrodes on two sides of the supercapacitor respectively to moisten the electrodes, thereby making the electrodes and the electrolyte integrated firmly. A total thickness of the prepared supercapacitor is about 1 mm, and the thickness of the polySH electrolyte is 0.4 mm.

Prior to an electrochemical test, the prepared capacitor is sealed with an adhesive tape to prevent evaporation of water.

The polySH electrolyte precursor solution refers to a monomer mixture prior to polymerization. A preparation method thereof includes the following the steps of: 1) dissolving LiCl in a first solvent to prepare 1-7 mol L$^{-1}$ of LiCl deionized aqueous solution.

2) Dissolving SBMA and HEA in the LiCl solution in a molar ratio of SBMA to HEA of 1:(3-5). Placing the solution in an ice bath, stirring for 1 h, and then, adding an initiator AIBA in an adding amount equivalent to 0.5 to 2 wt % of total mass of the monomer. Then, placing the initiator in the ice bath, and stirring for 1.5 h.

3) After dissolving the solution completely, performing ultrasonic treatment for 8 to 15 min to remove bubbles; and obtaining the polySH electrolyte precursor solution.

Advantages

In the present disclosure, the specific capacitance of the supercapacitor assembled by using the activated carbon as the electrode is 178 mF cm$^{-2}$ at 60° C., and is 134 mF cm$^{-2}$ at −30° C., showing the wider operating temperature range. With its good freezing resistance, the capacitance of the capacitor can still be reserved by 95.5% of an initial value even the capacitor is placed at −30° C. for 30 days. Upon 10,000 cycles, the retention rates of the specific capacitance are 81% and 71% of initial capacitance respectively, so that the capacitor can operate at low temperature for a long time. In addition, with the toughness and adhesive force of the hydrogel electrolyte, there will no structural damage to the supercapacitor in actual applications, and the specific capacitance of the capacitor can still be reserved by 78.5% upon 500 warps. In the prior art, electrical conductivity is contradictory with freezing resistance, so improving the freezing resistance tends to cause reduction in the electrical conductivity. In the present disclosure, the supercapacitor can improve both the freezing resistance and the electrical conductivity simultaneously, while operating at low temperature for a long time. Limitations and prejudices in the prior art are broke through.

In the present disclosure, by simulating biological macromolecules, zwitterions are introduced to a polymer network to create the antifreezing hydrogel electrolyte (polySH). As freezable water content of polySH is less than 10%, the high freezing resistance and electrical conductivity are achieved. Upon the addition of LiCl, the freezing process of water is broken, and especially, high-concentration LiCl achieves a more significant effect on reducing a freezing point of the hydrogel electrolyte. This makes the capacitor operate at low temperature for a long time.

In fact, in addition to the freezing resistance, a salt in a system is easy to dissociate under the electrostatic interaction of the zwitterions and salt ions, thereby increasing the number of free ions in the system. In addition, the zwitterionic group can provide a migration channel for cations and anions that are separated from each other under the action of an external electric field to improve the electrical conductivity, thereby achieving high ionic conductivity of 12.6 mS cm$^{-1}$ at −40° C. The polySH electrolyte even can be stretched to 325% of strain and compressed to 75% of strain at −40° C., which makes it applied in the field of ion conductor and response materials. These findings indicate the use of the zwitterions may be a feasible strategy of preparing the antifreezing solid electrolyte with high electrical conductivity.

BRIEF DESCRIPTION OF THE DRAWINGS

FIG. 1: A schematic diagram of a polySH hydrogel electrolyte and a network structure thereof.

FIG. 2A: DFT calculation of interaction of different components in the polySH electrolyte.

FIG. 2B: MSD of the salt ions in the polySH electrolyte.

FIG. 10A: CV curves of a polySH-based supercapacitor at 25° C.

FIG. 10B: CV curves of a polySH-based supercapacitor at −30° C.

FIG. 10C: CV curves of a polySH-based supercapacitor at 60° C.

DETAILED DESCRIPTION OF THE EMBODIMENTS

Figure 3A:
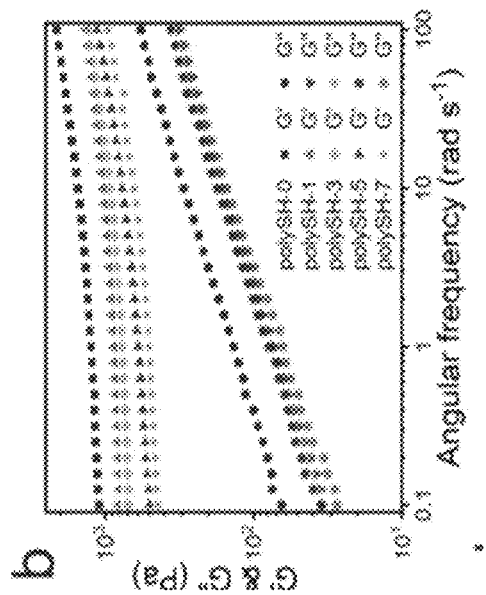
FIG. 3A: The ionic conductivity of PolySH, PolyHEA, and PVA electrolytes.

Sulfobetaine methacrylate (SBMA), hydroxyethyl acrylate (HEA), azobisisobutryamide chloride (AIBA), and lithium chloride (LiCl) were purchased from Aladdin. Polyvinyl alcohol 1799 (PVA), polyvinylidene fluoride (PVDF), and methylpyrrolidone (NMP) were purchased from Macklin. The carbon cloth was purchased from CeTech Co., Ltd. The activated carbon (AC) was purchased from Kuraray Co., Ltd. The carbon black was purchased from Alfa Aesar.

EXPLANATION OF NAMES

SBMA: Sulfobetaine methacrylate;
HEA: Hydroxyethyl acrylate;
polySH: Poly (SBMA-HEA) electrolyte, that is, the zwitterionic polymer hydrogel electrolyte of the present disclosure.
polyHEA electrolyte: Poly (HEA) electrolyte.
AC: Activated carbon;
PVDF: Polyvinylidene fluoride;
AIB A: Azobisisobutryamide chloride;
PVA electrolyte: Polyvinyl alcohol 1799 electrolyte. PVA-1799 indicates polyvinyl alcohol with degree of polymerization of 1700 and alcoholysis degree of 99%.
Electrochemical Test Ionic conductivity was measured based on an electrochemical impedance spectroscopy (EIS) at an electrochemical workstation (CHI660E). Firstly, the polySH electrolyte was placed between two steel sheets and then, and was stabilized at different temperatures for 5 h, and an EIS test was performed. To reduce any error, each sample was measured for three times. The ionic conductivity (a, mS cm$^{-1}$) was obtained by the following formula:

$$\sigma = \frac{L}{RS}$$

Where, R is resistance (a), S is a contact area (cm$^2$) of the electrolyte, and L is a thickness (cm) of the tested electrolyte.

A linear voltage-current curve (LSV) of the electrolyte was obtained in a range of −1.2 to 1.3 V with Ag/AgCl as a reference electrode. The electrochemical property of the capacitor was measured using a two-electrode system on a CHI 660E electrochemical workstation. Cyclic voltammetry (CV) was obtained via different scanning ranges within the voltage range of 0 to 1 V. The electrochemical impedance spectroscopy (EIS) was measured at 10 mV within the range of 0.01 Hz to 100 kHz. A galvanostatic charge/discharge (GCD) was measured under different current densities within the range of 0 to 1 V. The cycling stability was evaluated by 10,000 cycles in GCD. Prior to the test, the supercapacitor device was stabilized at different temperatures for 5 h. The specific area capacitance $C_{sp}$ (mF cm$^{-2}$) of a single electrode was obtained by GCD calculation, with a calculation formula:

$$C_{sp} = 4\frac{I\Delta t}{S_{device}\Delta V}$$

Where, I is applied current (mA), Δt is discharge time (s), $S_{device}$ is a total area of the capacitor electrode (cm$^2$), and ΔV represents discharge voltage (V).

Mechanical Property Test

A tensile test was performed using an all-purpose test instrument (Hensgrand, WDW-02, China). An electrolyte sample was a cylinder with a diameter of 5 mm, and a length of 40 mm, and the strain speed was 100 mm min$^{-1}$. In a compression test, a cylindrical sample with a diameter of 10 mm, and a height of 15 mm was adopted, the compressive strain was 75%, and the compression speed was 10 mm min$^{-1}$. Prior to a low-temperature test, all samples were stabilized at low temperature for 24 h.

A T-peel experiment was conducted using a universal testing machine at room temperature at a tensile speed of 100 mm min$^{-1}$. One electrode of the supercapacitor was fixed, the other electrode was stripped, and a coverage area was 4 mm×65 mm.

A rheological test was conducted using a parallel plate with a diameter of 25 mm through an ARES-G2 rheometer. Firstly, a linear viscoelasticity area was determined via dynamic strain scanning at angular frequency of 10 rad s$^{-1}$ within the range of 0.1 to 100%. Frequency scanning was performed within the frequency range of 0.1 to 100 rad s$^{-1}$, and the fixed strain was 1%.

Other Representations

The Raman spectrum was recorded using a LabRAM tHR800 Raman spectrometer (HORIBA JY, France), with a laser excitation wavelength of 532 nm. For differential scanning calorimetry (D supercapacitor), a TAQ-10 D supercapacitor instrument was used, temperature ranged from −80° C. to 50° C., a heating rate was 10° C. min$^{-1}$, and the sample mass ranged from 5 to 10 mg every time.

Embodiment 1

Preparation of polySH Hydrogel Electrolyte

In the presence of LiCl, a zwitterionic type polySH electrolyte was prepared from SBMA and HEA by a one-pot random polymerization method. Firstly, LiCl was dissolved in deionized water (8 ml) to prepare 3 mol L$^{-1}$ of LiCl solution. 0.75 g of SBMA and 1.25 g of HEA (total mass of 2 g, and molar ratio of 1:4) were dissolved in 8 ml of LiCl solution, and after the solution was placed in an ice bath and was stirred for 1 h, 0.02 g of initiator AIBA (equivalent to 1 wt % of total mass of a monomer) was added; and then, a mixture was placed in the ice bath and was stirred for 1.5 h. After the solution was dissolved completely, an ultrasonic treatment was performed for 10 min to remove bubbles; and then, a precursor solution was injected into a mold, and was polymerized in sealed environment of 38° C. for 12 h. Hydrogel obtained through polymerization is SH-3 for short, where 3 is the molar concentration of LiCl.

Assembly of Supercapacitor

The preparation of activated carbon electrodes: Activated carbon AC, conductive carbon black, and PVDF (mass ratio of 8:1:1) were dispersed in NMP to prepare uniformly dispersed material slurry. The slurry was coated to carbon cloth and dried in a vacuum oven at 180° C. for 24 h, and upon drying, the AC electrodes were obtained, the loading capacity of an active material on each electrode was about 2.5 mg cm$^{-2}$.

The assembly of the supercapacitor: two sides of the electrolyte were covered with two AC electrodes with the same loading areas (0.5 cm×1.2 cm) to form a sandwich structure for preparation of the supercapacitor. Then, a drop of polySH electrolyte precursor solution was dripped on the electrodes on two sides of the supercapacitor respectively to moisten the electrodes, thereby making the electrodes and the electrolyte integrated firmly. A total thickness of the prepared supercapacitor was about 1 mm, and the thickness of the polySH electrolyte was 0.4 mm. Prior to an electrochemical test, the prepared capacitor was sealed with an adhesive tape to prevent evaporation of water.

Embodiment 2

Others are the same as the embodiment 1, with a difference of changes in the concentration of LiCl in the hydrogel. In the presence of LiCl, a zwitterionic type polySH electrolyte was prepared from SBMA and HEA by a one-pot random polymerization method. Firstly, LiCl was dissolved in deionized water (8 ml) to prepare 7 mol L$^{-1}$ of LiCl solution. 0.75 g of SBMA and 1.25 g of HEA (total mass of 2 g, and molar ratio of 1:4) were dissolved in 8 ml of LiCl solution, and after the solution was placed in an ice bath and was stirred for 1 h, 0.02 g of initiator AIBA (equivalent to 1 wt % of total mass of a monomer) was added; and then, a mixture was placed in the ice bath and was stirred for 1.5 h. After the solution was dissolved completely, an ultrasonic treatment was performed for 10 min to remove bubbles; and then, a precursor solution was injected into a mold, and was sealed and placed in environment of 38° C. for polymerization for 12 h. The hydrogel obtained through the polymerization is SH-7 for short, where 7 is the molar concentration of LiCl.

Different amounts of LiCl were dissolved in the deionized water (8 ml) to prepare 1-7 mol L$^{-1}$ of LiCl solutions at different concentrations. The hydrogel obtained through the polymerization is polySH-x for short, where x is the molar concentration of LiCl.

Comparative Embodiment 1-2

As a contrast, a polyHEA electrolyte and a PVA electrolyte were prepared. Preparation methods thereof were the same as that in the embodiment 1. The polyHEA electrolyte was obtained only through the polymerization of an HEA monomer. The preparation method thereof was the same as that of the polySH electrolyte. A PVA-based supercapacitor took PVA as the electrolyte. A preparation method was the same as that of the supercapacitor containing the polySH electrolyte.

The PVA electrolyte was obtained in the water bath at high temperature: 2 g of PVA was added into 8 ml of LiCl solution (1-7 mol L$^{-1}$), and then, was placed in a water bath at 85° C. for stirring, and after PVA was dissolved completely, the PVA electrolyte was obtained.

Result Analysis

As shown in the FIG. 1, anionic and cationic groups on SBMA are sites for binding to Li$^+$ and Cl$^-$, which are conductive to the dissociation of a lithium salt. To verify this assumption, a density functional theory (DFT) calculation was performed on a system. FIG. 2a shows the optimum configuration of an SBMA fragment using a LiCl salt. Prior to the addition of the lithium salt, anions and cations on SBMA will interact with cations and anions on other SBMAs due to electrostatic interactions (ESBMA-SBMA: −4.025 Kcal mol$^{-1}$) to form an inner salt under an electrostatic interaction so as to keep the neutrality of the system. Upon the addition of LiCl, compared with —N$^+$(CH$_3$)$_2$ SO$_3^-$, binding energy of —SO$_3^-$Li$^+$ was lower (−18.15 Kcal mol$^{-1}$), indicating that —SO$_3^-$ was more likely to bind with Li$^+$ (FIG. 2a) Therefore, the introduction of zwitter groups promotes the dissociation of LiCl, and provides a site support for the migration of Lit A study on an ionic migration mechanism in the polySH electrolyte was conducted by a molecular dynamics method. It is generally acknowledged that for the polymer electrolyte, Li$^+$ can undergo hopping migration through continuous complexing and decomposition with O, S, N, and other polar groups on a polymer chain. As shown in the FIG. 2b, mean square displacements (MSD) of Li$^+$ and Cl$^-$ are in linear relation with a time interval in the polySH and polyHEA electrolytes. In the polySH electrolyte, gradients of Li$^+$ and Cl$^-$ are larger than those of Li$^+$ and Cl$^-$ in the polyHEA electrolyte, indicating that the rate of diffusion was higher in the poly-electrolyte, which is benefited from zwitterionic groups in SBMA for providing a channel for ionic migration. Taking into the lower binding energy of SO$_3^-$ and Li$^+$ and the higher rate of diffusion of Lit the transport of Li$^+$ shall undergo continuous complexing and decomposition (FIG. 1e) at a position of the SO$_3^-$ group. A more important fact is that in LiCl at high concentration, Li ions could bind with H$_2$O molecules to form a Li$^+$(H$_2$O)$_n$ structure. Therefore, the migration of the Li ions shall also be associated with a Li$^+$(H$_2$O)$_n$ solvation structure for the purpose of contribution to the freezing resistance of polySH, which has been verified by a Raman spectrum, differential scanning calorimetry (DSC) and molecular simulation.

At a room temperature, the ionic conductivity of the polySH electrolyte under different salt concentrations was also measured. For the purpose of comparison, the electrical conductivity of the polyHEA electrolyte and the traditional PVA electrolyte was also measured. As shown in the FIG. 3a (see Table 1 for specific data), the electrical conductivity of the polySH electrolyte was higher than that of polyHEA at a certain salt concentration. With the increase in the salt concentration, the electrical conductivity of the polySH electrolyte was also increased. When the concentration of LiCl reached about 5 mol L$^{-1}$, a threshold value was observed, indicating that the binding of the anions and cations with Li$^+$ and Cl$^-$ was saturated. At a room temperature, the electrical conductivity of the polySH electrolyte was 146 mS cm$^{-1}$, indicating that the introduction of the zwitter groups provided the migration channel for Lit, thereby improving the migration rate of Li$^+$ greatly. In addition, compared with the traditional PVA electrolyte, the polySH electrolyte has the higher electrical conductivity, indicating that the polySH electrolyte has a potential to be applied in an energy storage apparatus.

TABLE 1

Ionic conductivities of PolySH, PolyHEA, and PVA electrolytes

| Concentration | Electrolyte | | |
| --- | --- | --- | --- |
| | PolySH | polyHEA | PVA |
| | Electrical conductivity | | |
| 1 mol L$^{-1}$ | 41.2 | 51.5 | 54.8 |
| 2 mol L$^{-1}$ | 91.2 | 88.0 | 72.7 |
| 3 mol L$^{-1}$ | 114.7 | 92.8 | 91.7 |
| 4 mol L$^{-1}$ | 130.5 | 114.2 | 109.7 |
| 5 mol L$^{-1}$ | 146.3 | 125.3 | 110.65 |
| 6 mol L$^{-1}$ | 143.8 | 132.1 | 108.7 |
| 7 mol L$^{-1}$ | 146.2 | 114.4 | 102.1 |

Figure 3B:
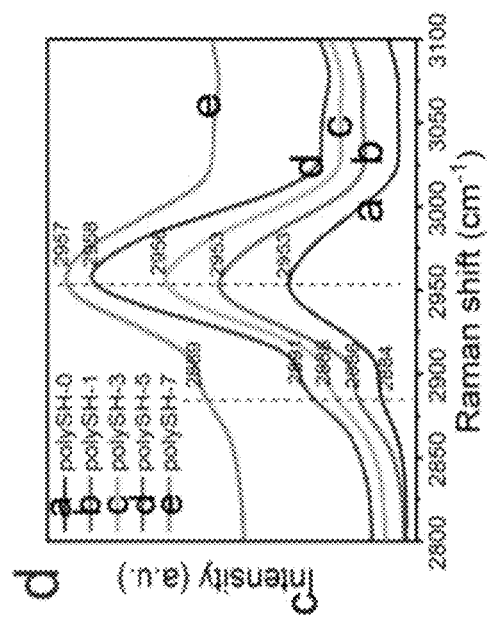
FIG. 3B: Viscoelastic characteristics of polySH electrolytes with different LiCl contents. Raman spectra of —$SO_3^-$.
Figure 3C:
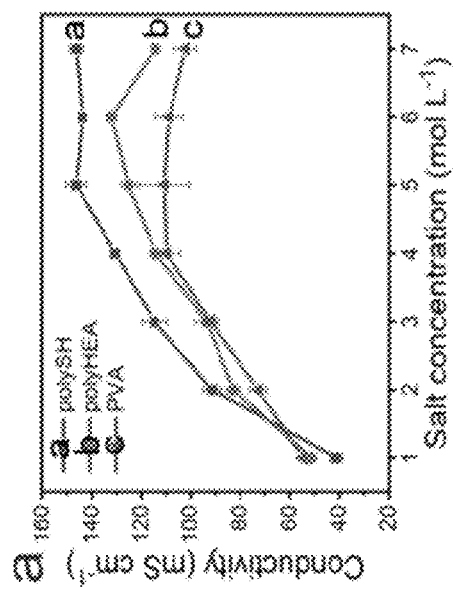
FIG. 3C: Viscoelastic characteristics of polySH electrolytes with different LiCl contents. Raman spectra of —$N^+(CH_3)_2$.
Figure 3D:
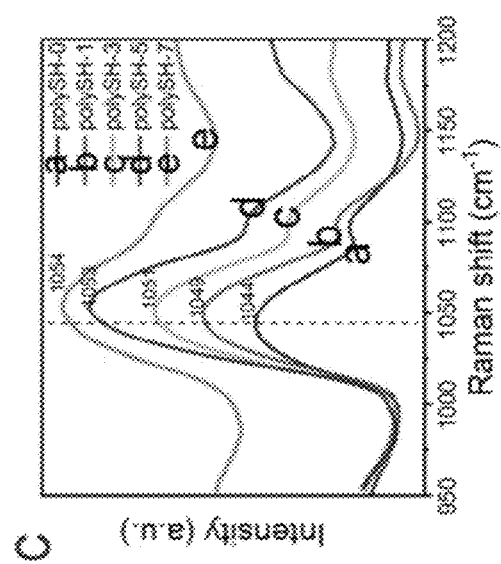
FIG. 3D: Viscoelastic characteristics of polySH electrolytes with different LiCl contents in polySH electrolytes with different salt concentrations.

The addition of the salt also changed the rheological property of the polySH electrolyte. Firstly, the linear viscoelasticity area of the polySH electrolyte was measured under the strain of 10 rad s$^{-1}$ within the range of 0.1 to 100%. Then, all viscoelasticity tests were conducted under the strain of 1% to ensure the effectiveness and sufficient sensitivity of linear viscoelasticity. As shown in the FIG. 3b, the energy storage modulus G' of each polySH electrolyte is larger than loss modulus G'', indicating that the electrolyte showed elastic deformation and had a solid state behavior. As previously mentioned, an electrostatic interaction between the anions and the cations on a SBMA chain may improve the degree of crosslinking of a network to some extent, thereby achieving the higher modulus of polySH-0 hydrogel. With the increase in the salt concentration, the modulus of the polySH electrolyte is reduced gradually. Changes in the mechanics modulus of the electrolyte indicate that an interaction between anion and cation groups is destroyed by LiCl, resulting in reduction in the crosslinking density of the polymer network. To further understand the interaction between the ion groups on the polymer chain and salt ions, a Raman spectrum study was conducted on the polySH electrolyte. With the increase of the salt concentration from polySH-0 to polySH-7, S=O stretching vibration in —SO3-was changed gradually from 1044 cm$^{-1}$ to 1054 cm$^{-1}$, and CH$_3$ stretching vibration in —N$^+$(CH$_3$)$_2$ was changed gradually from 2953 cm$^{-1}$ to 2957 cm$^{-1}$ (FIGS. 3c and 3d). Changes in these peaks indicate that an electrostatic equilibrium between the original anions and cations in zwitterion is destroyed, and a new electrostatic equilibrium occurs between the anions and cations.

Figure 4A:
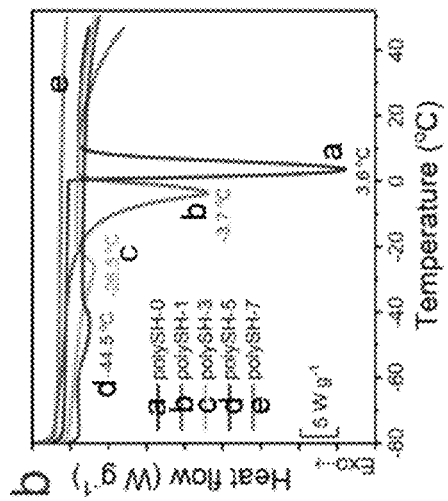
FIG. 4A: Raman spectrum of water in different polySH electrolytes.
Figure 4B:
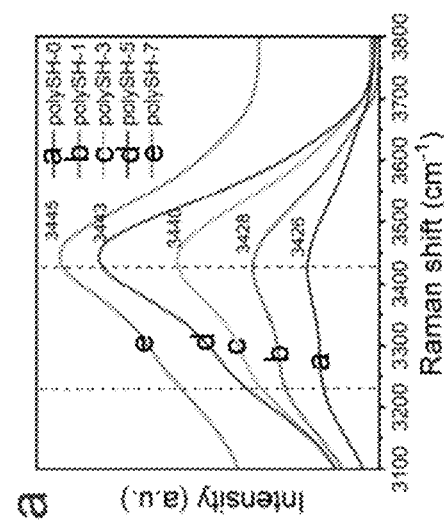
FIG. 4B: DSC results of polySH electrolytes with different LiCl contents.

The added LiCl not only interacts with the polySH polymer chain, but also affects a structure of solvent water in the system. This effect is manifested as reduction in the freezing point of the electrolyte intuitively. As shown in the FIG. 4a, the Raman spectrum shows changes in the stretching vibration of O—H in H$_2$O under different LiCl concentrations. A peak belonging to a hydrogen bond between water molecules is weakened gradually at 3230 cm$^{-1}$, correspondingly, an asymmetric contraction band at 3420 cm$^{-1}$ is sharpened gradually with the increase in the LiCl concentration, and a corresponding peak also undergoes a certain shift. These changes indicate that the added LiCl destroys the hydrogen bond between the water molecules, and forms a Li$^+$(H$_2$O)$_n$ solvation structure with H$_2$O. It is generally acknowledged that a water state in hydrophilic polymer hydrogel is at least divided into two categories: non-freezable bound water and freezable water. Non-frozen water caused by an interaction between other components in a hydration system does not show a phase change in thermometric analysis. By a DSC method, the relative content of water in different states can be measured, which provides a tool for quantitative analysis on a freezing state of the polySH electrolyte. It can be seen from FIG. 4b that polySH-0 has similar melting property to pure water in the absence of LiCl, which produces melting peaks at nearly 0° C., meaning there is a large amount of freezable water in the polySH-0 hydrogel. Upon the introduction of LiCl, with the increase in the LiCl concentration, the melting peak of water in the polySH electrolyte starts to shift towards subzero temperature. A calculation formula of the content of the freezable water in the polySH electrolyte is as below:

$$W_f (\%) = \frac{\Delta H_m}{\Delta H_m^0 W_{H2O}}$$

Where, W$_f$ is the content of the freezable water in the electrolyte, ΔH$_m$ is an enthalpy of fusion of the freezable water in the electrolyte, which is obtained by integrating a DSC melting peak, and MO is an enthalpy of fusion of the pure water, which is 333.5 J g$^{-1}$. W$_{H2O}$ is the relative content of the water in the electrolyte, that is, W$_{H2O}$=m$_{H2O}$/m$_{total}$. Upon calculation, the content of the freezable water of the polySH-0 hydrogel is 80.5%. The content of the freezable water of the polySH-5 hydrogel is reduced to 8.2% gradually. There is no melting peak in a calorimetric map of polySH-7, indicating that there is almost no freezable water in the polySH-7 electrolyte within the temperature range of −80 to 50° C. These data indicates that the content of the freezable water in the electrolyte is less if the concentration of LiCl is higher. Based on the above analysis, the addition of LiCl destroys the freezing process of the water, and especially, high-concentration LiCl achieves a more significant effect on reducing a freezing point of the hydrogel electrolyte. The content of freezable water in the electrolyte with high salt concentration is lower than 10% (polySH-5, and polySH-7); and preferably, the content of the freezable water in the electrolyte is zero. (polySH-7).

Figure 4C:
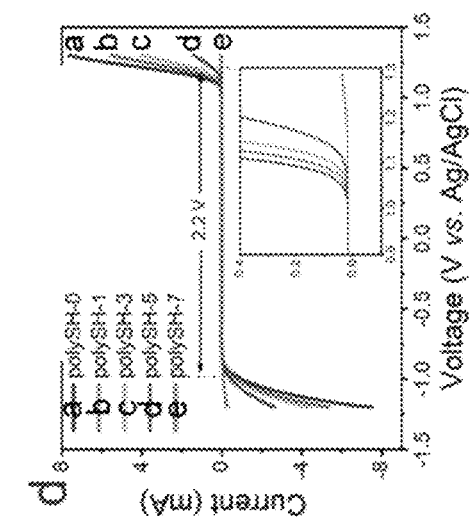
FIG. 4C: MSD of water in different polySH electrolytes.
Figure 4D:
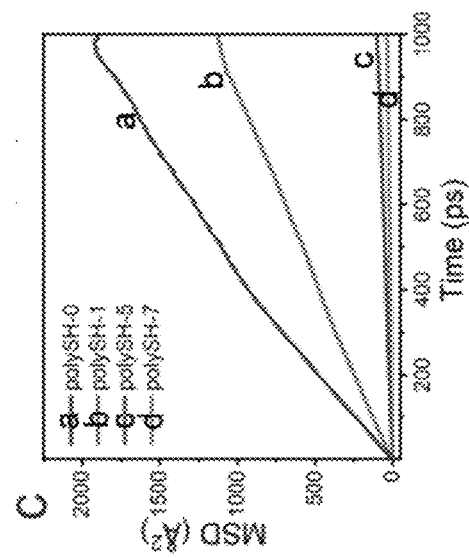
FIG. 4D: Electrochemical stability windows of various electrolytes measured by an LSV method.

The diffusion coefficient of the water molecule of the electrolyte is shown in Table 2. To further make a study on the interaction of Li$^+$—H$_2$O, several electrolytes underwent an MSD simulation at a room temperature to understand the diffusion property of the water molecule. As shown in the FIG. 4c, MSD is in linear relation with a time interval. With the increase in the LiCl concentration, a slope of a curve is reduced, indicating that the diffusion of the water molecule is limited greatly with high LiCl concentration. The diffusion coefficient of the water molecule is calculated according to MSD. As there is no LiCl in polySH-0, the high diffusion coefficient of the water molecule is 19.08×10$^{-5}$ cm$^2$s$^{-1}$. With the increase in the LiCl concentration, the diffusion coefficient of the water molecule of polySH-7 is reduced gradually to 0.4×10$^{-5}$ cm$^2$ s$^{-1}$, which was only 2.1% of polySH-0. It is proved that the formation of the Li$^+$(H$_2$O)$_n$ solvation structure in the electrolyte and reduction in the content of the freezable water endow the polySH electrolyte with the excellent freezing resistance. The state of the water in the polymer hydrogel is also reflected in an electrochemical stability window of the electrolyte. As shown in the FIG. 4d, with the increase in the LiCl concentration, the electrochemical window of the polySH electrolyte measured in linear sweep voltammetry (LSV) is broadened from 2.0 V of polySH-0 to 2.2 V of polySH-7. The binding of Li$^+$ and the H$_2$O molecule reduces the activity of the water molecule, thereby inhibiting the decomposition of the water molecule under high pressure.

TABLE 2

Diffusion coefficient of the water molecule of the polySH electrolyte under different salt concentrations

| System | Value (10$^{-6}$cm$^2$s$^{-1}$) |
|---|---|
| H$_2$O (0 mol) | 19.08 |
| H$_2$O (1 mol) | 11.21 |
| H$_2$O (5 mol) | 1.02 |
| H$_2$O (7 mol) | 0.40 |

Figure 5:
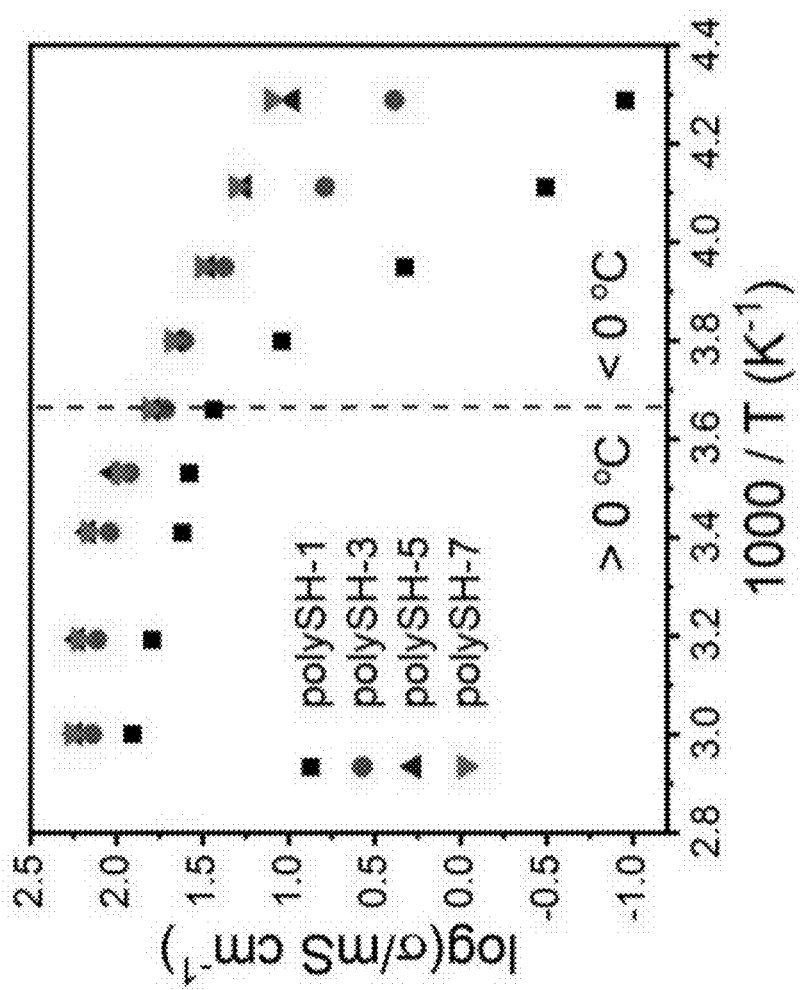
FIG. 5: The ionic conductivity of the polySH electrolyte at different temperatures.
Figure 6A:
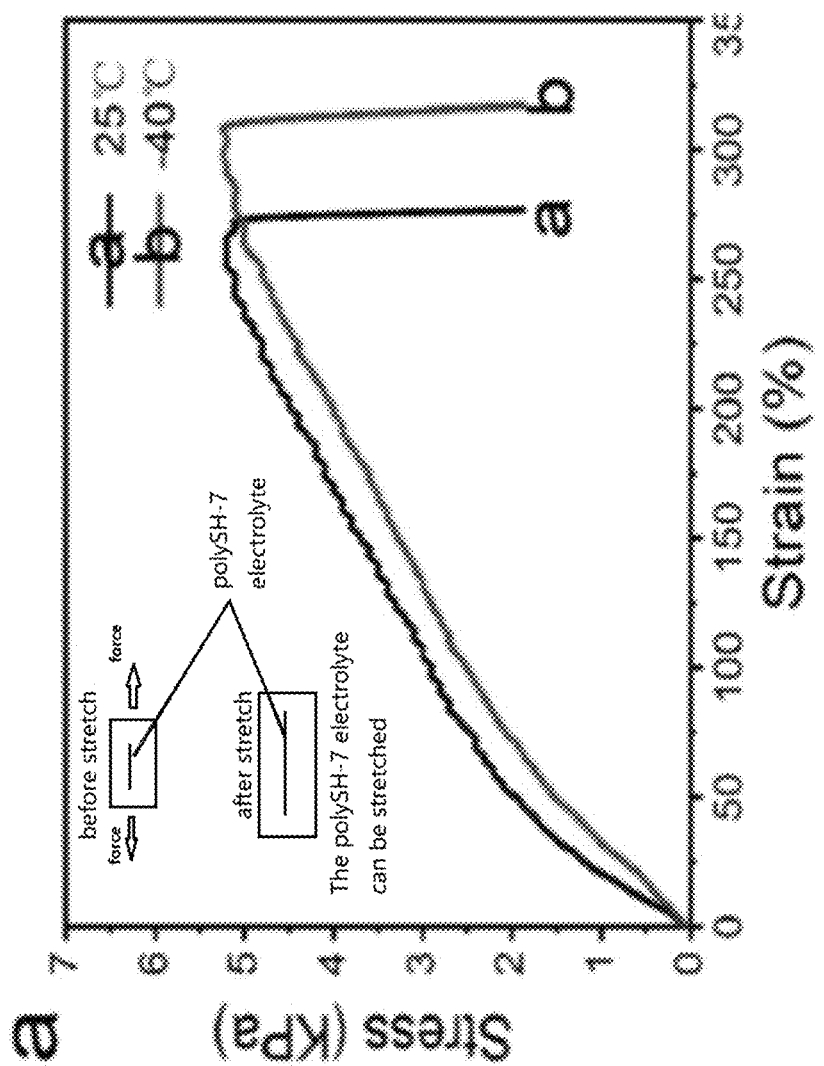
FIG. 6A: Stress-strain curves of stretch of the polySH-7 electrolyte at different temperatures.
Figure 6B:
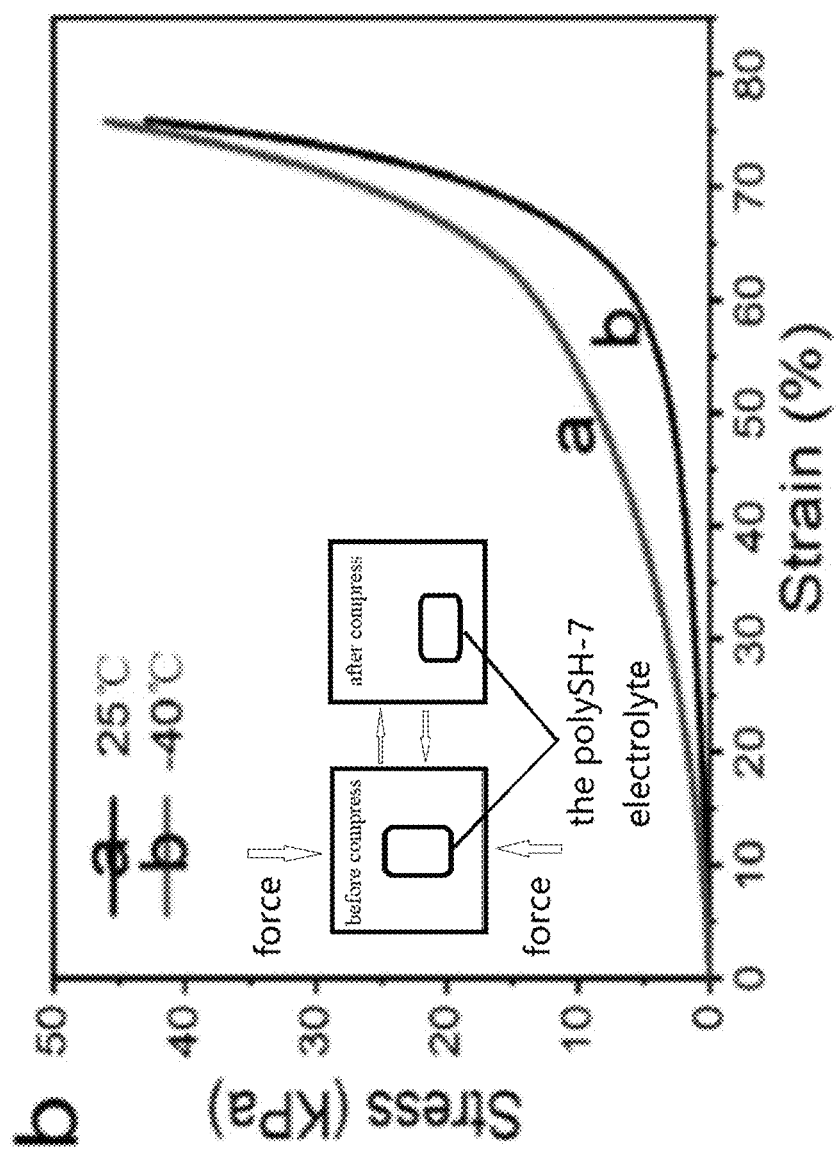
FIG. 6B: Stress-strain curves of compressibility of the polySH-7 electrolyte at different temperatures.

The addition of LiCl affects the water molecule and the polymer structure in the electrolyte system greatly, so that the polySH electrolyte has the excellent freezing resistance and high ionic conductivity at low temperature. FIG. 5 shows the change trends of the electrical conductivity of the polySH electrolyte at different temperatures. It can be seen that a curve is divided into two ranges: Above-zero temperature and subzero temperature. At above-zero temperature, the electrical conductivity of all electrolytes is reduced slowly with reduction in temperature, and thus, all electrolytes are in the non-freezing state. Within the range of subzero temperature, the electrical conductivity of the polySH-1 and polySH-3 electrolytes is reduced quickly, while the electrical conductivity of the polySH-5 and polySH-7 electrolytes reduces less. In addition, the ionic conductivity is in linear relation with a reciprocal of absolute temperature within the range of subzero temperature, indicating that the electrical conductivity of the electrolyte follows the Arrhenius law. The activation energy of each electrolyte within the range of subzero temperature is calculated, and with the increase in the salt concentration, the activation energy of the electrolyte is reduced. For example, the activation energy of polySH-1 is reduced from 33.5 kJ mol-1 to 9.5 kJ mol$^{-1}$ of polySH-7. The activation energy is an energy barrier that must be overcome during ionic migration, that is, ionic migration is easier if the activation energy is smaller. Therefore, the electrical conductivity of polySH-1 was increased from 0.11 mS cm$^{-1}$ to 12.6 mS cm$^{-1}$. LiCl with high concentration improves the freezing resistance of the electrolyte, so that its electrical conductivity is up to 12.6 mS cm$^{-1}$ at low temperature of −40° C. A more important fact is that the polySH-7 electrolyte still keeps the excellent toughness at −40° C. The polySH-7 electrolyte can be stretched to 325% of strain, slightly higher than strain at room temperature (FIG. 6a). Meanwhile, when the electrolyte is compressed to 75% of strain, a compressible curve of the electrolyte is similar to that at room temperature (FIG. 6b), indicating that the polySH-7 electrolyte can still keep the excellent mechanical property and stability at low temperature. At −40° C., the electrical conductivity of the polySH electrolyte at low temperature ranges from 11 to 13 mS cm$^{-1}$. The electrolyte can be stretched to 300 to 350% of strain at −40° C. When the electrolyte is compressed to 75% of strain, the compressible curve of the electrolyte is similar to that at room temperature.

Figure 7A:
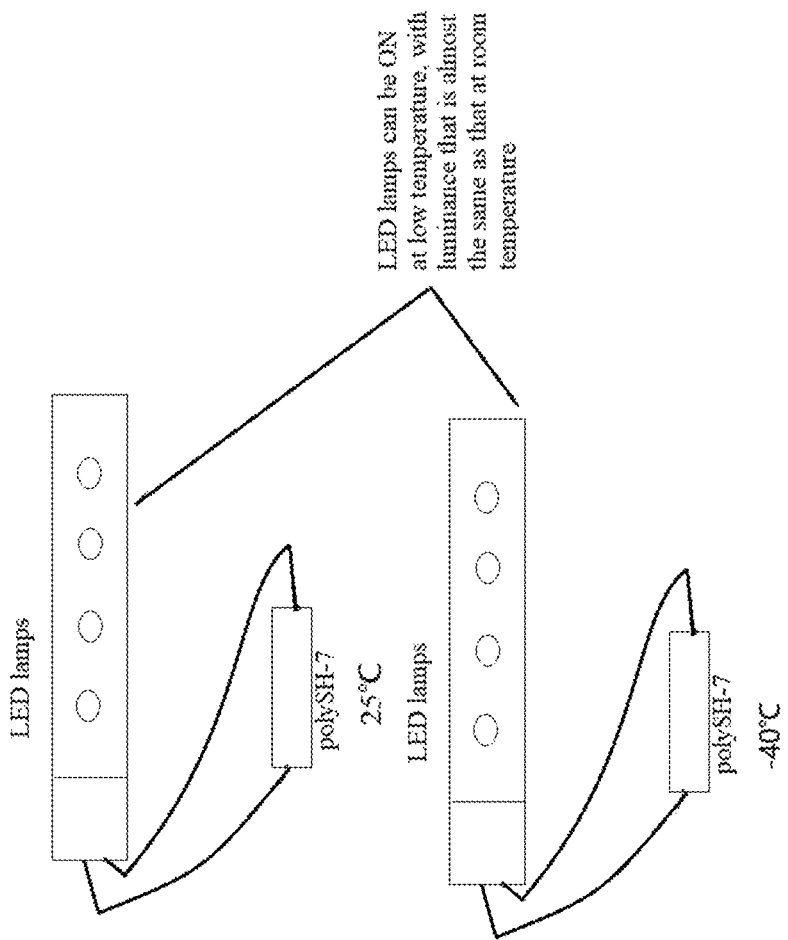
FIG. 7A: A circuit photograph of the polySH-7 electrolyte connected to LED lamps.
Figure 7B:
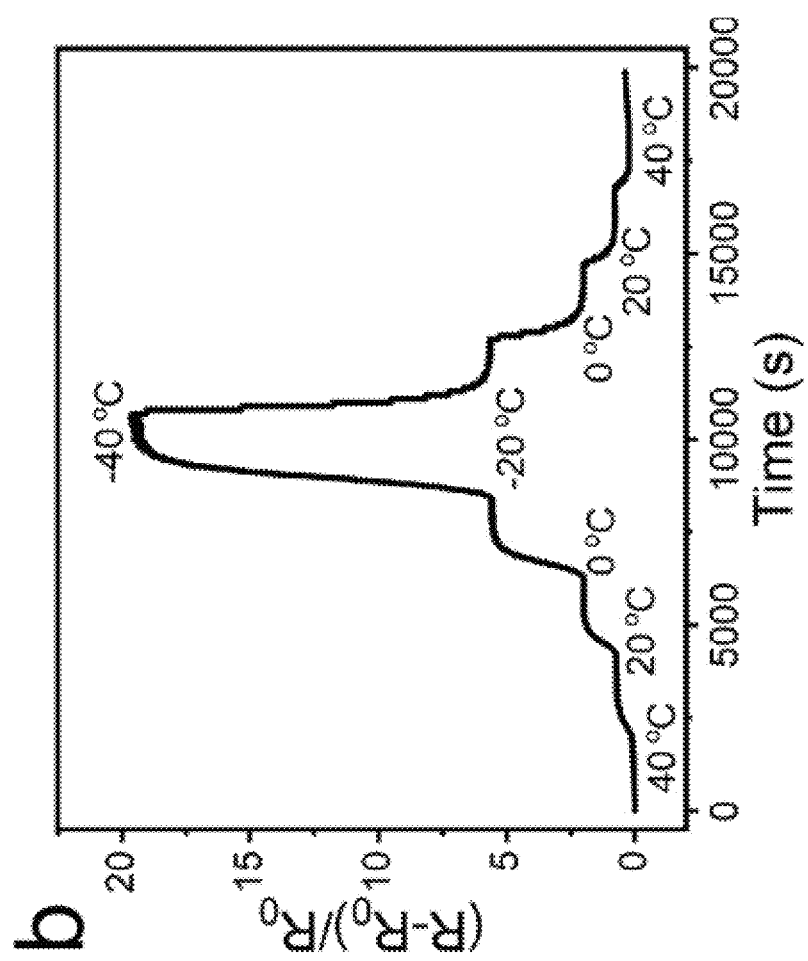
FIG. 7B: Resistance responses of the polySH-7 electrolyte at different temperatures.
Figure 7C:
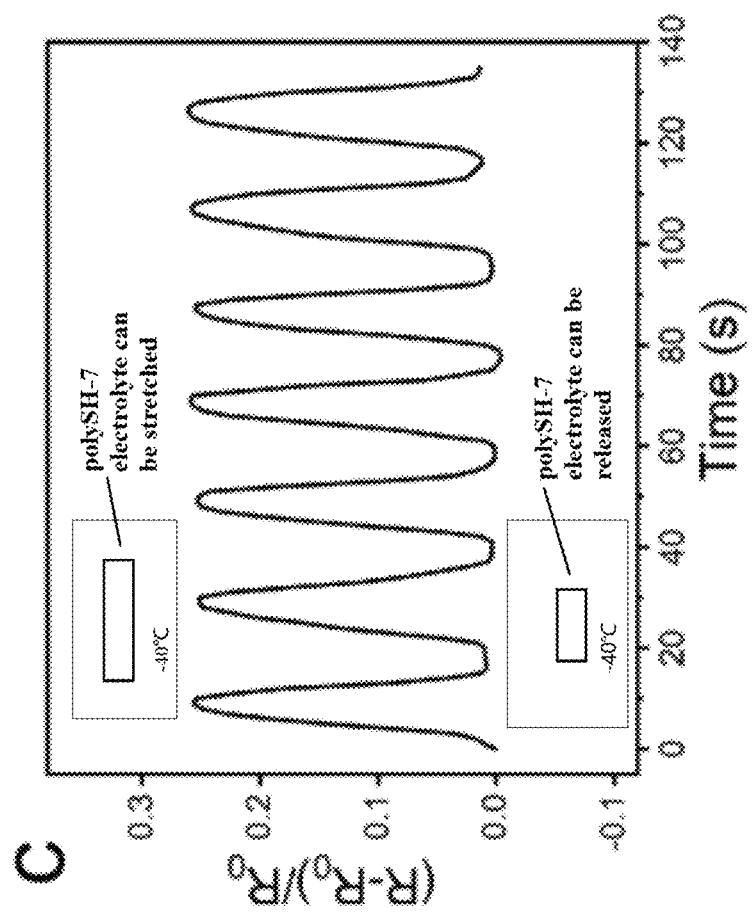
FIG. 7C: The resistance response of the polySH-7 electrolyte at −40° C. under a continuous stretch release cycle.
Figure 8:
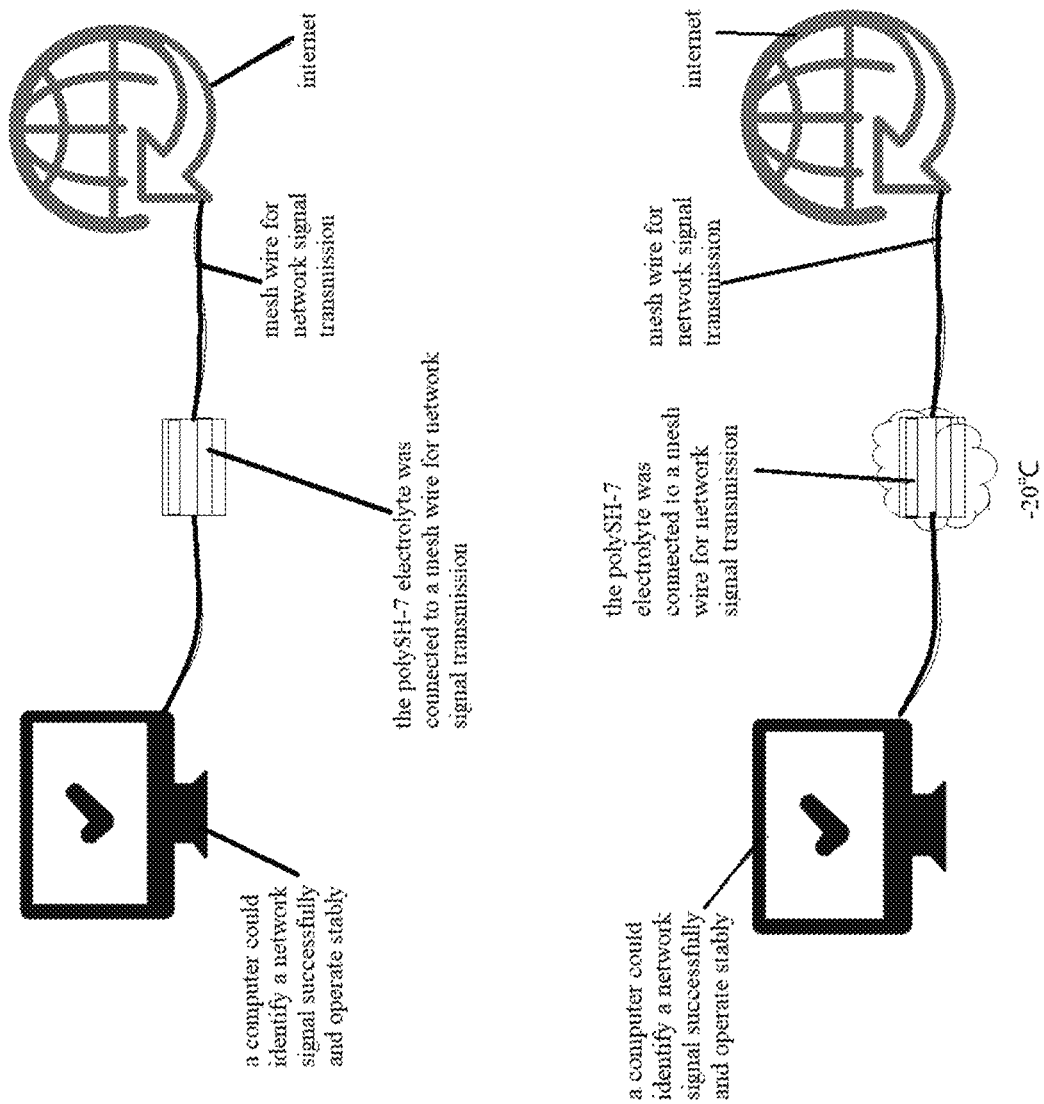
FIG. 8: Photographs of the polySH-7 electrolyte at normal temperature and low temperature (−20° C.) in a network circuit.

With excellent electrical conductivity and toughness at low temperature, the polySH electrolyte can be used as a low-temperature conductor. After polySH-7 is connected to a LED lamp circuit, LED lamps can be ON at low temperature, with luminance that is almost the same as that at room temperature (FIG. 7a). With changes in the electrical conductivity at different temperatures, the polySH electrolyte can also be used as a temperature response material. As shown in the FIG. 7b, the polySH-7 electrolyte was sealed, and placed within the range −40° C. to 40° C., and resistance changes were recorded. It is found that when temperature is changed, the resistance of the polySH-7 electrolyte is changed drastically, and when temperature keeps unchanged, the resistance keeps stable. Upon a high-low temperature cycle, the resistance of the polySH-7 electrolyte can still be restored to the original state, showing the excellent resistance invertibility. Different from strain sensors with operating temperature of above 0° C. in most reports, the polySH-7 electrolyte can be stretched and released at constant speed at −40° C., and the corresponding resistance change is uniform and has an excellent symmetrical shape (FIG. 7c). Even though upon several continuous stretch-release cycles, the resistance change still keeps stable, which has great significance to the application of the strain sensor at low temperature. To further verify the stability of the polySH electrolyte in conductor application, the polySH-7 electrolyte was connected to a mesh wire for network signal transmission. As shown in the FIG. 8a, after it is connected to a network circuit, a computer could identify a network signal successfully and operate stably. In a test of network delay, it is found that the network delay is maintained at a low level of 24 ms, with small fluctuation. A more important fact is that when the measured polySH-7 electrolyte is placed in low temperature environment (−20° C.) (FIG. 8b), the computer still operates normally, and the network delay is reduced only by 1 ms compared to it at room temperature (25 ms), indicating that the polySH-7 electrolyte has the almost same transmission effect as the metal mesh wire, which is an excellent signal transmission material.

TABLE 3

Resistance change rates of the polySH-7 electrolyte at different temperatures

| Temperature (° C) | 40 | 20 | 0 | −20 | −40 |
|---|---|---|---|---|---|
| Resistance change rate | 0 | 0.7 | 2.0 | 5.6 | 19.5 |

Figures 9A, 9B:
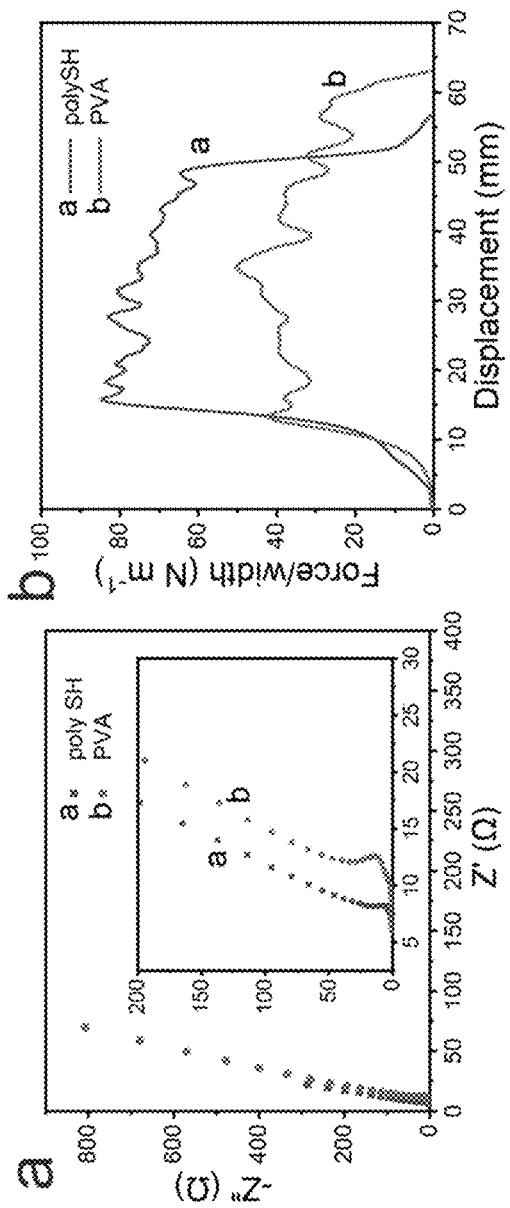
FIG. 9A: EIS spectrogram of a polySH-7-based capacitor and a PVA-based capacitor.
FIG. 9B: Adhesion tests of a polySH-7-based capacitor and a PVA-based capacitor.
Figures 11A, 11B, 11C:
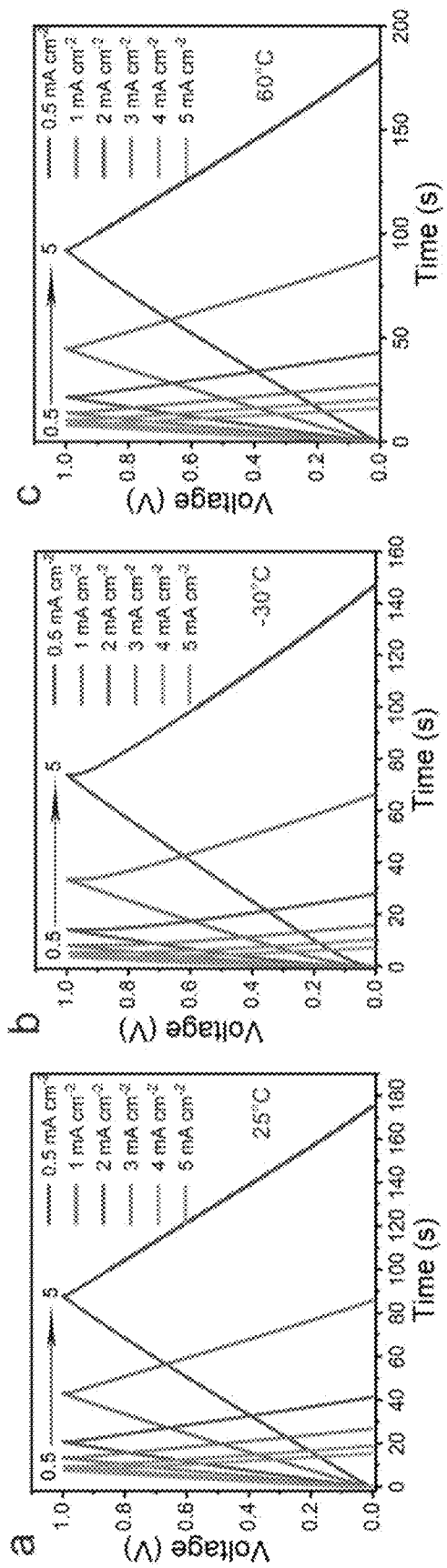
FIG. 11A: GCD curves of the polySH-based supercapacitor at 25° C.
FIG. 11B: GCD curves of the polySH-based supercapacitor at −30° C.
FIG. 11C: GCD curves of the polySH-based supercapacitor at 60° C.
Figure 12A:
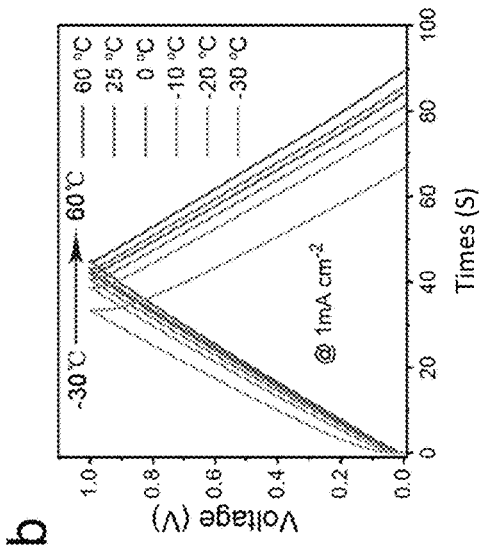
FIG. 12A: Electrochemical properties of the polySH supercapacitor at different temperatures: a CV curve at a scanning rate of 100 mV s$^{-1}$.
Figure 12B:
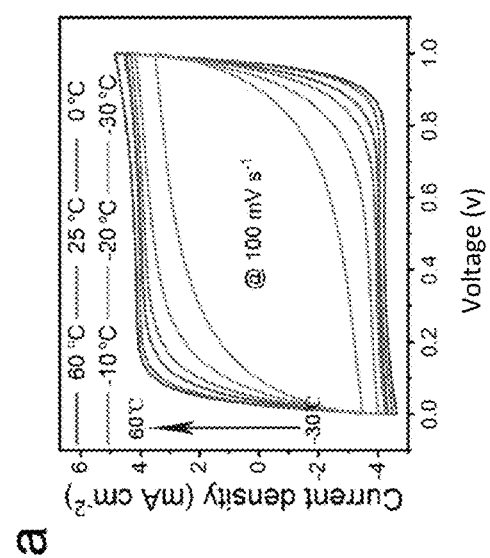
FIG. 12B: Electrochemical properties of the polySH supercapacitor at different temperatures: a GCD curve at a current density of 1 mA cm$^{-2}$.
Figure 12C:
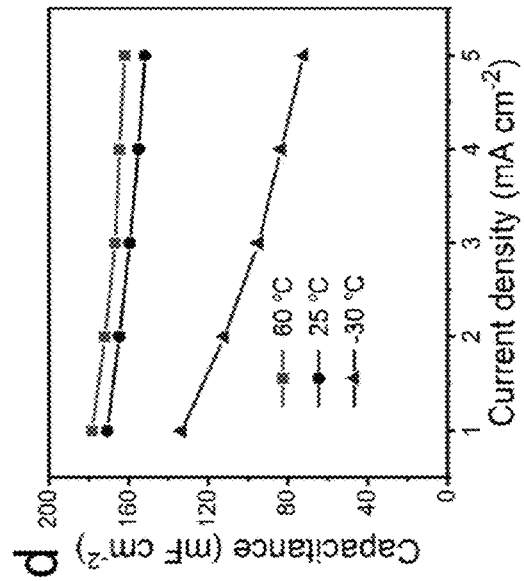
FIG. 12C: Electrochemical properties of the polySH supercapacitor at different temperatures: EIS spectrograms of the polySH-based supercapacitor at different temperatures.

Our polySH electrolyte was also assembled into a solid supercapacitor, and the electrochemical property was evaluated by using the activated carbon electrodes. With charged groups and polar groups in the zwitterion, the electrolyte was tightly bound with the electrode, thereby reducing damage to the supercapacitor structure and improving the electrochemical property of the supercapacitor at low temperature. Firstly, comparison against an EIS spectrogram of the assembly of the supercapacitors through the polySH electrolyte and the PVA electrolyte at room temperature was made (FIG. 9a). It can be seen that the polySH-based capacitor has smaller interface resistance compared to the PVA-based capacitor (1.8 vs 6.8Ω). According to the adhesion tests of the two capacitors, the adhesive force of a polysaccharide electrolyte is higher than that of the PVA electrolyte (85 N m$^{-1}$ vs 42 N m$^{-1}$) (FIG. 9b), indicating that the zwitterion is conductive to improving adhesion between the electrolyte and the electrode, which has the important significance on reducing the interface resistance and improving the electrochemical property of the supercapacitor. The study on the CV curves of the polySH-based capacitor at different temperatures was conducted further within the voltage range of 0 to 1V. As shown in the FIG. 10, the scanning rate of the solid supercapacitor is 1000 mV s$^{-1}$, which is far higher than those of other solid supercapacitors with AC electrodes. As shown in the FIG. 11, the GCD curves at different temperatures show regular inverted triangles, with a small voltage drop. The CV curves of 100 mV s$^{-1}$ within the range of −40° C. to 40° C. are shown in FIG. 12a. At 60° C., the CV curves maintain rectangular shapes similar to those at room temperature. Due to the unique water-retaining property of the zwitterion hydrogel, the supercapacitor can still achieve the excellent performance at high temperature. With reduction in temperature, the CV curves show a trend of gradual deformation. The GCD curves show the regular inverted triangles, only with a small voltage drop at −30° C. (0.1 V) (FIG. 12b). The EIS curves at different temperatures reflect the ionic migration ability. It can be seen that the EIS curves are almost parallel to an imaginary axis in a low-frequency area, indicating that the polySH electrolyte has the excellent ion diffusion behavior (FIG. 12c). At 25° C., the supercapacitor has series resistance of 6.3Ω, which is increased to 12.2Ω at −30° C., and reduced to 5.9Ω at 60° C. Temperature changes affect the diffusion rate of electrolyte ions, thereby affecting the electrochemical property of the supercapacitor. It should be noted that the supercapacitor shows interface resistance, which is 1.8Ω only at 25° C., indicating full contact between the electrode and the electrolyte and faster charge transfer rate.

TABLE 4

Specific capacitance of the supercapacitor under different current densities

| | Current density | | | | | |
|---|---|---|---|---|---|---|
| Temperature | 0.5 mA cm$^{-2}$ | 1 mA cm$^{-2}$ | 2 mA cm$^{-2}$ | 3 mA cm$^{-2}$ | 4 mA cm$^{-2}$ | 5 mA cm$^{-2}$ |
| 25° C. | 184 | 178.4 | 172 | 166.8 | 164.8 | 162 |
| −30° C. | 174.4 | 170.8 | 164.8 | 159.6 | 155.2 | 152 |
| 60° C. | 146.6 | 133.2 | 112 | 94.8 | 83.2 | 72 |

Figure 12D:
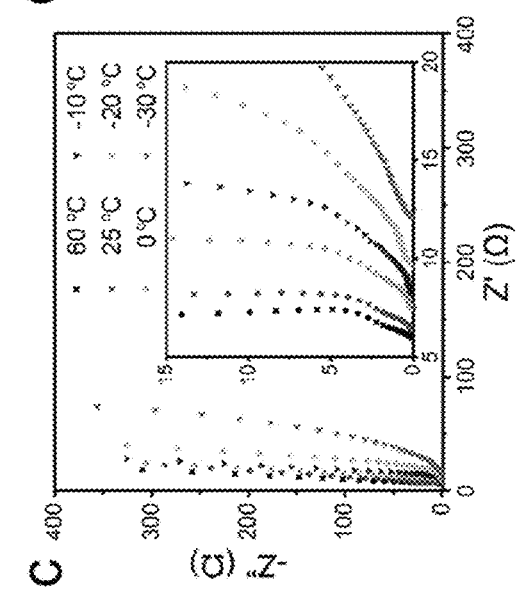
FIG. 12D: Electrochemical properties of the polySH supercapacitor at different temperatures: a specific area capacity of the polySH-based supercapacitor calculated by the GCD curve.
Figure 13:
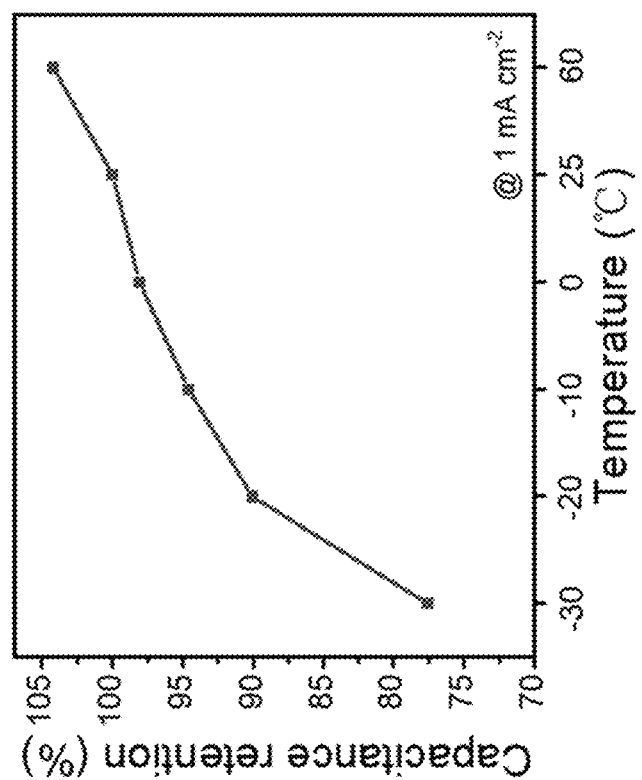
FIG. 13: A capacitance retention of the polySH-based capacitor at different temperatures.
Figure 14:
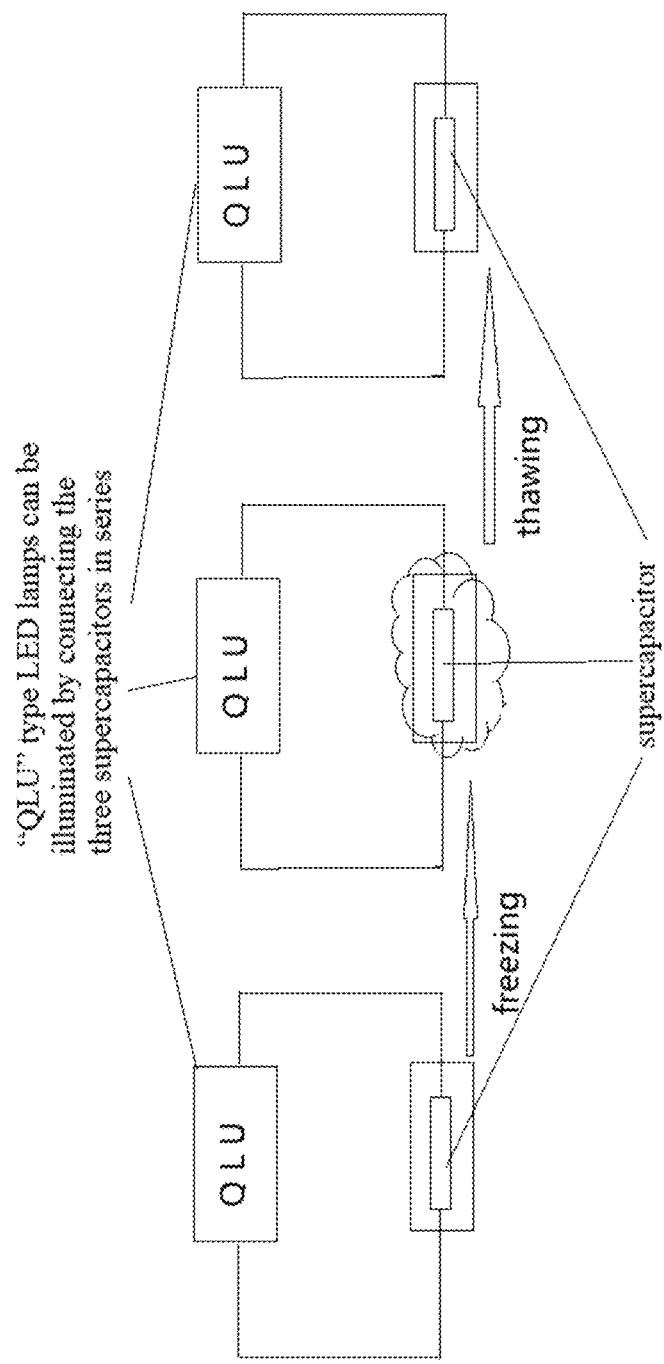
FIG. 14: A photograph of lamps lightened in freezing and thawing states of the polySH-based supercapacitor.
Figures 15A, 15B, 15C:
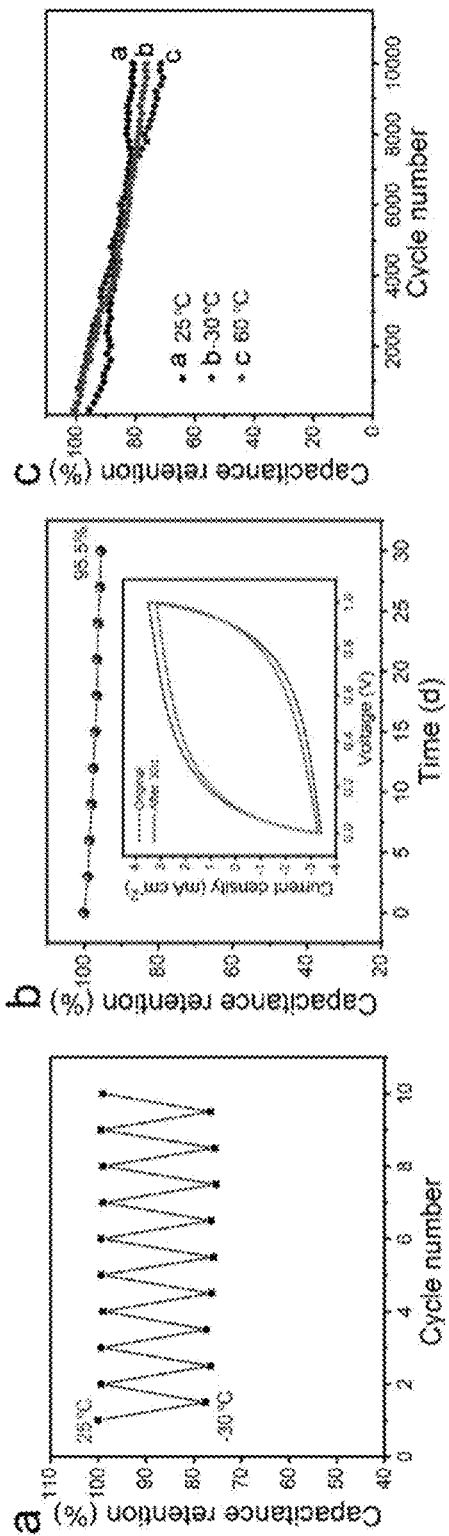
FIG. 15A: The capacitance retention of the polySH-based supercapacitor upon 10 freezing and thawing cycles
FIG. 15B: The capacitance retention of the supercapacitor frozen at −30° C. for 30 days.
FIG. 15C: The cycling stability of the polySH-based supercapacitor at different temperatures upon 10,000 cycles.

Specific area capacitance values under different current densities were calculated according to the GCD curves (FIG. 12d). (For specific capacitance data, see Table 4) At 25° C., the specific capacitance of the supercapacitor was 171 mF cm$^{-2}$ at 1 mA cm$^{-2}$, and 152 mF cm$^{-2}$ at 5 mA cm$^{-2}$, a drop of 11%, indicating that the supercapacitor had the excellent rate capability. As shown by capacitance retention at different temperatures in the FIG. 13, when temperature is increased to 60° C. or reduced to −30° C., the specific area capacitance is changed to 178 mF cm$^{-2}$ and 134 mF cm$^{-2}$, which are 104% and 78% of that at 25° C., indicating the excellent the electrochemical property at extreme temperature. As shown in the FIG. 14, "QLU" type LED lamps (operating voltage of 2.5 V) can be illuminated by connecting the three supercapacitors in series. The supercapacitor can still operate normally after being frozen at low temperature for 24 h. Upon the unfreezing of the supercapacitor, the luminance of the LED lamps is not changed significantly compared to the initial state, indicating that low temperature does not pose irreversible damage to the supercapacitor. To further prove the freezing resistance of the supercapacitor, the electrochemical property of the supercapacitor was measured at 25° C. and −30° C. for multiple times. As shown in the FIG. 15a, the specific capacitance can still be restored the initial level at room temperature after the supercapacitor is unfrozen. Even upon 10 cycles of freezing and thawing, the capacitance value of the supercapacitor is still the same as that at room temperature (FIG. 10a). More importantly, when the supercapacitor is placed at low temperature of −30° C. for more than 30 days, its capacitance is only reduced to 95.5% of the original capacitance (see FIG. 15 b). Cycling stability was tested at different temperatures. As shown in the FIG. 15c, upon 10,000 cycles, the capacitance retention of the supercapacitor was 71%, 81%, and 76.4% respectively at −30° C., 25° C., and 60° C. Such excellent cycle performance indicates the polySH-based supercapacitor can operate at low temperature and high temperature for a long time.

Figure 16A:
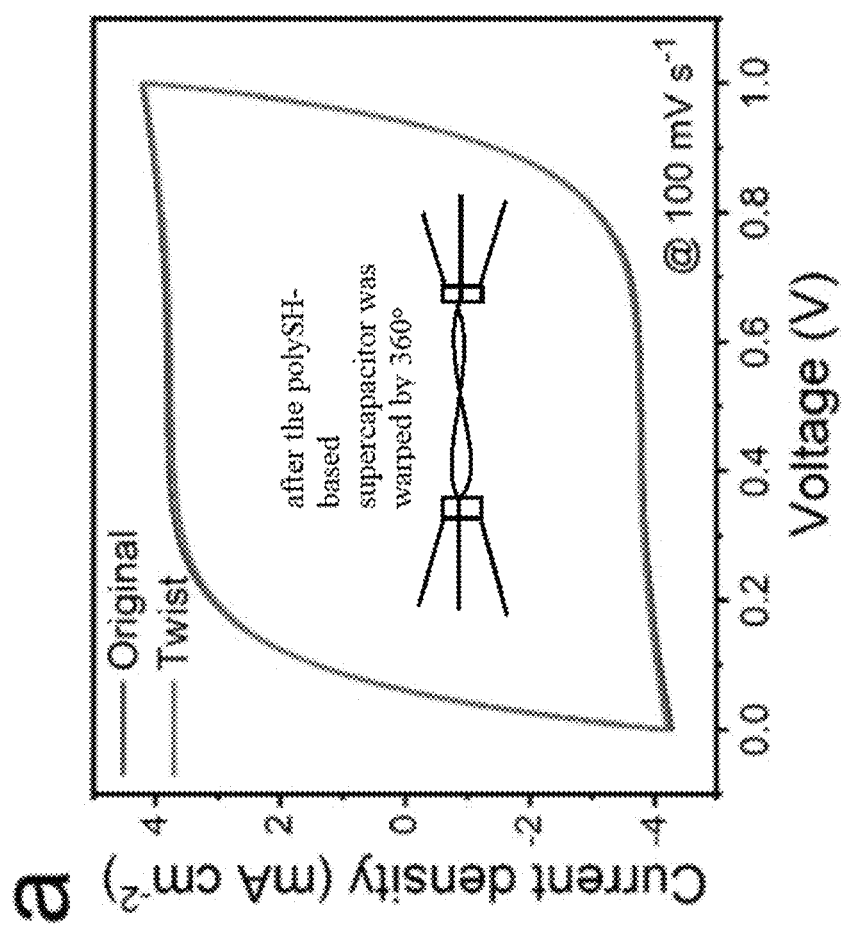
FIG. 16A: The CV curve of the polySH-based supercapacitor under a 360° warp.
Figure 16B:
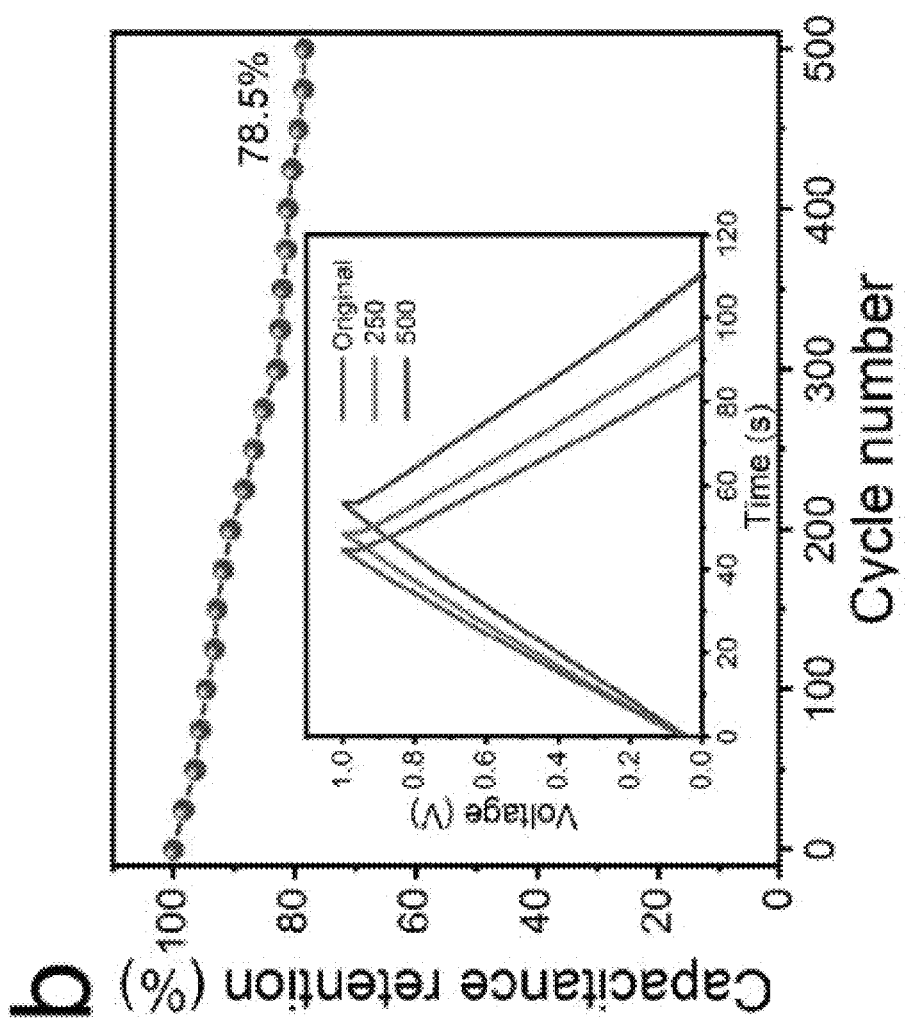
FIG. 16B: The capacitance retention of the supercapacitor upon 500 warp cycles.
Figure 16C:
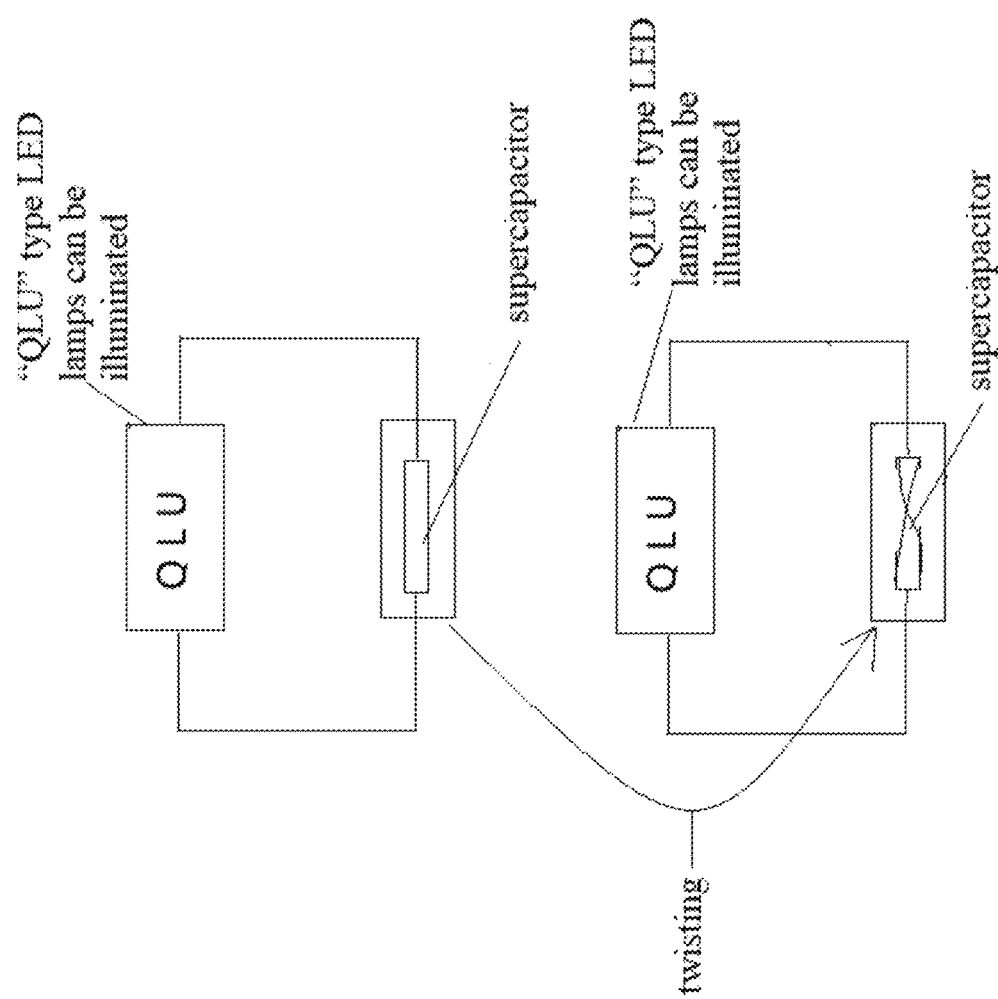
FIG. 16C: A photograph of LED lamps lightened in the warping state of the supercapacitor.
Figure 17A:
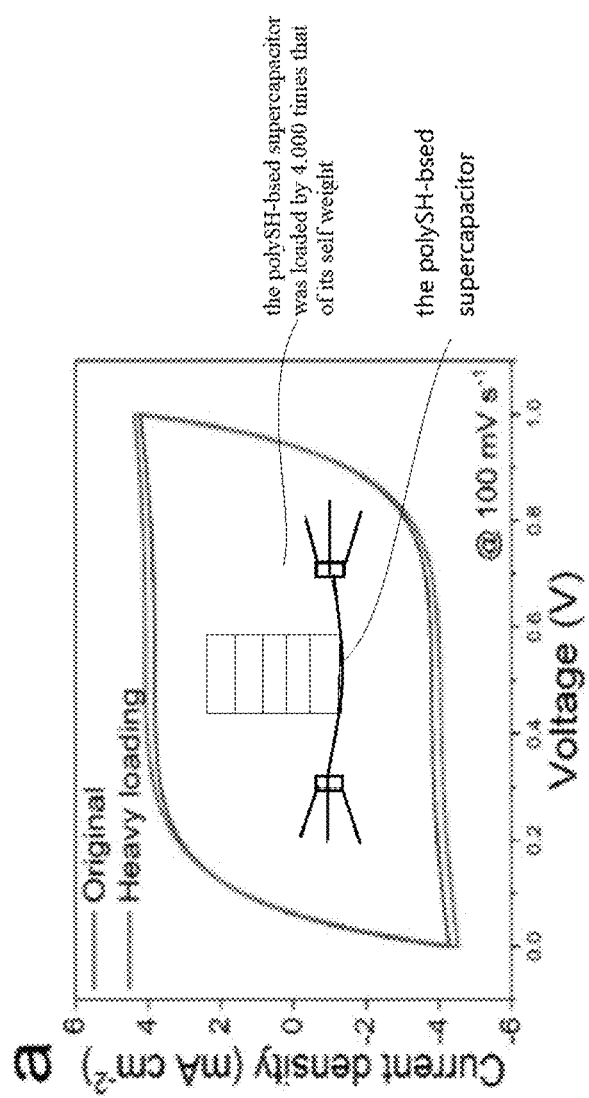
FIG. 17A: CV curves of the polySH-based supercapacitor in a heavy-duty state.
Figure 17B:
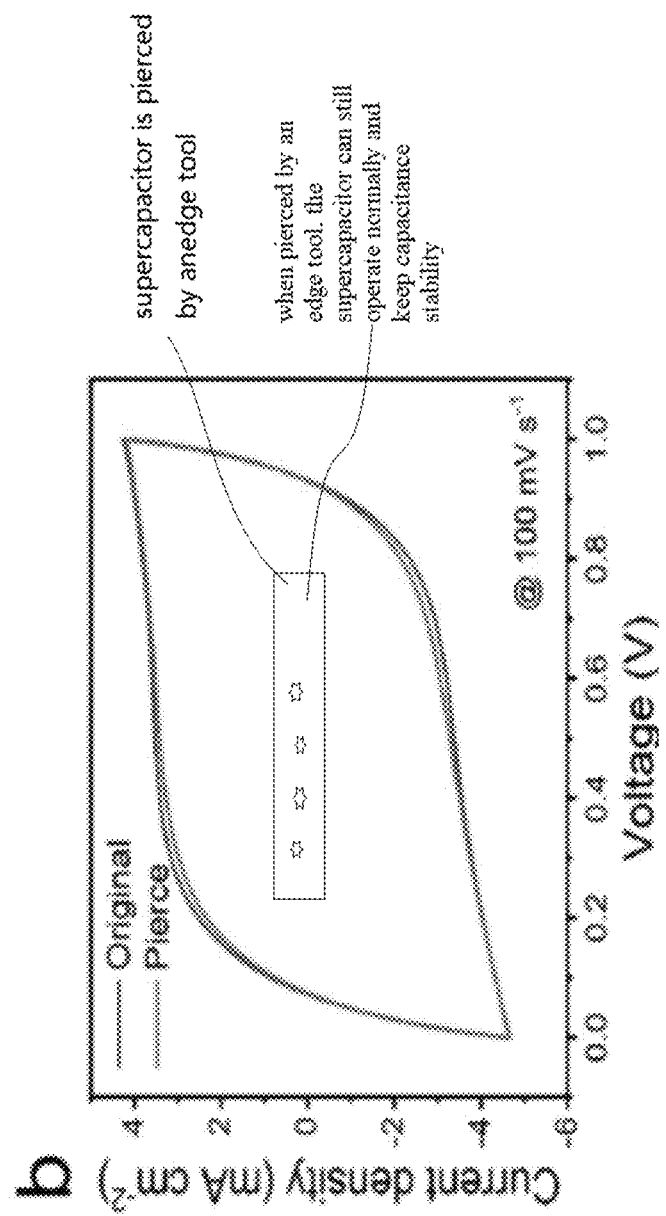
FIG. 17B: CV curves of the polySH-based supercapacitor in a perforating state.
Figure 17C:
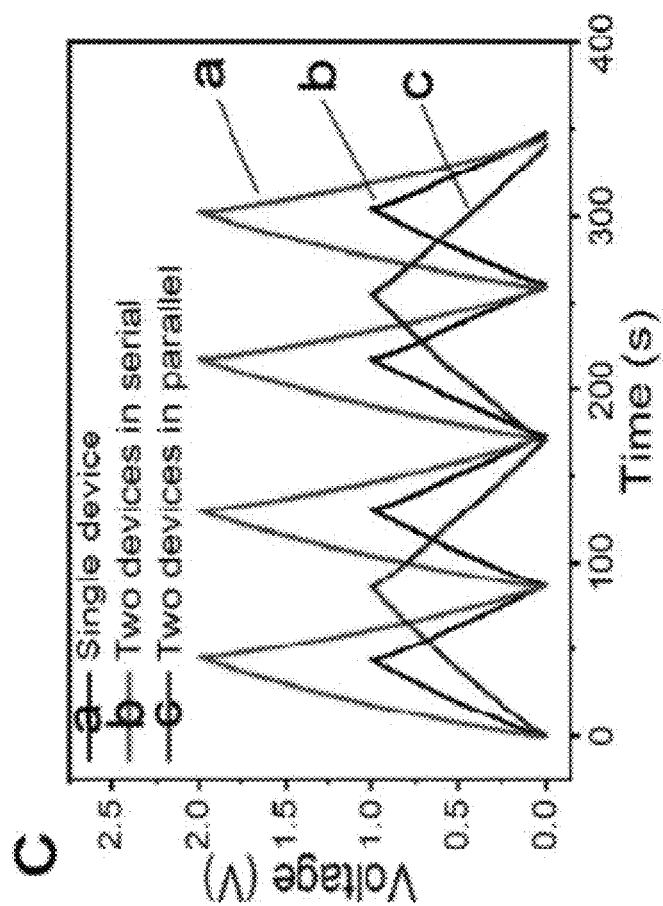
FIG. 17C: The GCD curves of two supercapacitors that are connected in series and parallel.

In addition to the freezing resistance, the solid supercapacitor has also the excellent flexibility, which can avoid structural damage in actual applications, thereby prolonging the service life. As shown in the FIG. 16a, after the polySH-based supercapacitor was warped by 360°, the CV curves showed the capacitance behavior which was almost the same as the initial state. The capacitance retention of the supercapacitor was still 78.5% upon 500 warp cycles (FIG. 16b). After the supercapacitor was connected to the circuit, there was no significant change in the luminance of the LED lamps before and after the warping of the supercapacitor (FIG. 16c), indicating that large deformation will not affect the electrochemical property. Due to the flexibility of the whole supercapacitor and the excellent adhesive force between the electrode and the electrolyte, the supercapacitor can still maintain structural integrity in case of deformation. When the polySH-based supercapacitor was loaded by 4,000 times that of its self weight, the capacitance was increased slightly, which may be caused by the shortening of an ion transport path in the electrolyte at a high load (FIG. 17a). With the excellent mechanical property of the polySH electrolyte, the supercapacitor is free of short circuit at the heavy load. In addition, when pierced by an edge tool, the supercapacitor can still operate normally and keep capacitance stability (FIG. 17b). In the actual applications, higher voltage and higher energy density can be obtained by connecting a plurality of supercapacitors in series and parallel. In our works, compared with the single supercapacitor, the two supercapacitors are connected in series to display a voltage window of 2.0 V. During connection in parallel, discharge time is almost increased by 2 times (FIG. 17c). Therefore, the freezing resistance and excellent mechanical strength of our polySH electrolyte expand the application field of the energy storage apparatus.

What is claimed is:

1. A supercapacitor comprising a zwitterionic polymer hydrogel electrolyte (polySH) including a poly (SBMA-HEA) electrolyte in the presence of LiCl; wherein in a Raman spectrum, S=O stretching vibration in —SO$_3^-$ ranges from 1044 cm$^{-1}$ to 1054 cm$^{-1}$, and CH3 stretching vibration in —N$^+$(CH$_3$)$_2$ ranges from 2953 cm$^{-1}$ to 2957 cm$^{-1}$, and the LiCl forms a Li+(H$_2$O)n solvation structure with H$_2$O, which still has an elongation of 325% at −40° C.; wherein the content of freezable water of the electrolyte is lower than 10% (polySH-5, and polySH-7); and wherein the electrolyte has a water molecule diffusion coefficient of less than or equal to 11.21*10$^{-6}$ cm$^2$ s$^{-1}$.

2. The supercapacitor according to claim 1, wherein a change rate of a capacitance retention of the supercapacitor, relative to a specific area capacity at 25° C., is less than 25% at extreme temperature.

3. The supercapacitor according to claim 1, wherein when the supercapacitor is placed at low temperature of −30° C. for more than 30 days, a capacitance of the supercapacitor is still reserved by more than 95% of the original capacitance; and upon 10,000 cycles, the supercapacitor has a capacitance retention of more than 70%.

4. The supercapacitor according to claim 1, wherein at a room temperature, the polySH electrolyte has an electrical conductivity of 114 to 147 mS cm$^{-1}$; and at −40° C., the electrolyte has a low temperature electrical conductivity of 11 to 13 mS cm$^{-1}$; the electrolyte being stretchable to 300 to 350% of strain at −40° C.

5. The supercapacitor according to claim 1, wherein the electrolyte has a water molecule diffusion coefficient of less than or equal to 1.02*10$^{-6}$ cm$^2$ s$^{-1}$.

6. The supercapacitor according to claim 1, wherein according to a preparation method of the hydrogel electrolyte, in the presence of LiCl, the zwitterionic type polySH electrolyte is prepared from SBMA and HEA by a one-pot random polymerization method;

the preparation method comprises the following steps of:
i) dissolving LiCl in a first solvent to prepare 1-7 mol L$^{-1}$ of LiCl deionized aqueous solution; ii) dissolving SBMA and HEA in the LiCl solution in a molar ratio of SBMA to HEA of 1:(3-5); placing the solution in an ice bath, stirring for 1 h, and then, adding an initiator AIBA in an adding amount equivalent to 0.5 to 2 wt % of total mass of a monomer;
then, placing in the ice bath, and stirring for 1.5 h; iii) after dissolving the solution completely, performing ultrasonic treatment for 8 to 15 min to remove bubbles; and then, injecting the solution into a mold, and sealing and placing in an environment of 30 to 50° C. for polymerization for 8 to 16h.

7. The supercapacitor according to claim 6, wherein at step 1), the concentration of LiCl deionized aqueous solution ranges from 3-7 mol L$^{-1}$.

8. A preparation method for the supercapacitor according to claim 1, comprising the following steps of:
i) preparing activated carbon electrodes: dispersing activated carbon AC, conductive carbon black, and PVDF (mass ratio of 8:1:1) in NMP to prepare uniformly dispersed material slurry; coating the slurry onto carbon cloth and drying in a vacuum oven at 80° C. for 24 h, and obtaining the AC electrodes after drying, wherein a loading capacity of an active material on each electrode is about 2.5 mg cm$^{-2}$;

ii) assembling the supercapacitor: covering two sides of the electrolyte with two AC electrodes with the same loading areas (0.5 cm×1.2 cm) to form a sandwich structure for preparation of the supercapacitor; then, dripping a drop of polySH electrolyte precursor solution on the electrodes on two sides of the supercapacitor respectively to moisten the electrodes.

9. The preparation method according to claim 8, wherein the polySH electrolyte precursor solution refers to a monomer mixture prior to polymerization, the preparation method thereof comprises the following the steps of: i) dissolving LiCl in a first solvent to prepare 1-7 mol L$^{-1}$ of LiCl deionized aqueous solution; ii) dissolving SBMA and HEA in the LiCl solution in a molar ratio of SBMA to HEA of 1:(3-5); placing the solution in an ice bath, stirring for 1 h, and then, adding an initiator AIBA in an adding amount equivalent to 0.5 to 2 wt % of total mass of a monomer; then, placing the initiator in the ice bath, and stirring for 1.5 h; iii) after dissolving the solution completely, performing ultrasonic treatment for 8 to 15 min to remove bubbles; and obtaining a polySH electrolyte precursor solution.

10. The supercapacitor according to claim 6, wherein at step 1), the concentration of LiCl deionized aqueous solution ranges from 5-7 mol L$^{-1}$.

* * * * *